United States Patent [19]
Sato

[11] Patent Number: 5,642,225
[45] Date of Patent: Jun. 24, 1997

[54] IMAGE POSITION CORRECTING OPTICAL SYSTEM

[75] Inventor: Susumu Sato, Chiba, Japan

[73] Assignee: Nikon Corporation, Tokyo, Japan

[21] Appl. No.: 582,898

[22] Filed: Jan. 4, 1996

Related U.S. Application Data

[62] Division of Ser. No. 363,823, Dec. 27, 1994.

[30] Foreign Application Priority Data

Dec. 28, 1993 [JP] Japan ................................. 5-353453

[51] Int. Cl.$^6$ ................................................ G02B 27/64
[52] U.S. Cl. ........................... 359/557; 359/554; 359/692
[58] Field of Search ................................. 359/554–557, 359/676–677, 683–684, 689–692

[56] References Cited

U.S. PATENT DOCUMENTS

| | | | |
|---|---|---|---|
| 4,978,205 | 12/1990 | Sato | 359/557 |
| 5,000,549 | 3/1991 | Yamazaki | 359/557 |
| 5,168,403 | 12/1992 | Umeda et al. | 359/557 |
| 5,270,857 | 12/1993 | Oizumi et al. | 359/557 |
| 5,579,160 | 11/1996 | Sato | 359/557 |

*Primary Examiner*—Thong Nguyen
*Attorney, Agent, or Firm*—Shapiro and Shapiro

[57] ABSTRACT

Disclosed is an image position correcting optical system, comprising sequentially from an object side, a first lens group having positive refracting power and a second lens group having negative refracting power. The first lens group is fixed. The second lens group is so provided as to be movable along an optical axis. A part of lens subunits of lens elements constituting the first lens group is so provided as to be movable in a direction across the optical axis. A positive lens element of the lens elements constituting the first lens group satisfies the following conditions:

$$1.43 \leq n_d \leq 1.65$$

$$65 \leq v_d \leq 95$$

$$0.302 \leq \theta_{FCd} \leq 0.309$$

where $n_d$ is the refractive index with respect to the d-line, $n_F$ is the refractive index with respect to the F-line, $n_c$ is the refractive index with respect to the C-line, $v_d$ is the Abbe number with respect to the d-line, and $\theta_{FCd}$ is the partial dispersion ratio expressed by $(n_d - n_c) / (n_F - n_c)$.

7 Claims, 18 Drawing Sheets

IMAGE POSITION CORRECTING OPTICAL SYSTEM

This is a division of application Ser. No. 08/363,823 filed Dec. 27, 1994.

BACKGROUND OF THE INVENTION

1. Field of the Invention

The present invention relates generally to an image position correcting optical system and, more particularly, to an optical system incorporating a function to correct a fluctuation in an image position that is derived from a shake of a lens.

2. Related Background Art

In the present specification, a "correction of an image position" means correcting a fluctuation in the image position due to a shake or the like by displacing a certain lens unit in a direction across an optical axis.

In a conventional image position correcting optical system, as disclosed in the specification of U.S. Pat. No. 4,907,868, the number of lens elements constituting an image position correcting lens unit is as large as 4, enough to occupy a space that is elongate along the optical axis. As a result, there increases a size of a drive actuator for displacing the image position correcting lens unit in a direction substantially orthogonal to the optical axis.

Further, according to an image position correcting optical system disclosed in the specification of U.S. Pat. No. 4,978,205, the image position correcting lens unit is composed of three pieces of lens elements, but a secondary chromatic aberration is not compensated.

As explained above, the conventional image position correcting optical system presents such inconveniences that the image position correcting lens unit is constructed of a large number of lens elements, and the drive actuator of the image position correcting lens unit and, in turn, the optical system as a whole increase in size.

Also, if down-sizing is attained to some degree by reducing the number of lens elements constituting the image position correcting lens unit, the compensation of the secondary chromatic aberration is insufficient, resulting in such an inconvenience that an imaging performance is poor.

SUMMARY OF THE INVENTION

It is a primary object of the present invention, which was devised in view of the problems given above, to provide a small-sized image position correcting optical system in which a secondary chromatic aberration is well compensated.

To accomplish the above object, according to one aspect of the present invention, there is provided an image position correcting optical system, comprising sequentially from an object side: a first lens group having positive refracting power; and a second lens group having negative refracting power, wherein the first lens group is fixed, the second lens group is so provided as to be movable along an optical axis, a part of lens subunits of lens elements constituting the first lens group is so provided as to be movable in a direction across the optical axis, and a positive lens element of the lens elements constituting the first lens group satisfies the following conditions:

$1.43 \leq n_d \leq 1.65$ $65 \leq v_d \leq 95$ $0.302 \leq \theta_{FCd} \leq 0.309$ where $n_d$ is the refractive index with respect to the d-line, $n_F$ is the refractive index with respect to the F-line, $n_c$ is the refractive index with respect to the C-line, $v_d$ is the Abbe number with respect to the d-line, and $\theta_{FCd}$ is the partial dispersion ratio expressed by $(n_d-n_c)/(n_F-n_c)$.

Further, to accomplish the above object, according to another aspect of the present invention, there is provided an image position correcting optical system, comprising sequentially from an object side: a first lens group having positive refracting power; a second lens group having negative refracting power; and, a third lens group having positive refracting power, wherein the first lens group is fixed, the second lens group is so constructed as to be movable along an optical axis, the third lens group is so constructed as to be movable in a direction across the optical axis, and a positive lens element of the lens elements constituting the first lens group satisfies the following conditions:

$1.43 \leq n_d \leq 1.65$ $65 \leq v_d \leq 95$ $0.302 \leq \theta_{FCd} \leq 0.309$ where $n_d$ is the refractive index with respect to the d-line, $n_F$ is the refractive index with respect to the F-line, $n_c$ is the refractive index with respect to the C-line, $v_d$ is the Abbe number with respect to the d-line, and $\theta_{FCd}$ is the partial dispersion ratio expressed by $(n_d-n_c)/(n_F-n_c)$.

To accomplish the above object, according to still another aspect of the present invention, there is provided an image position correcting optical system, comprising sequentially from an object side: a first lens group having positive refracting power; a second lens group having negative refracting power; and a third lens group having positive refracting power, wherein the first lens group is fixed, at least one lens element having negative refracting power in the second lens group is so constructed as to be movable along the optical axis, at least one lens element having positive refracting power and at least one lens element in the third lens group are so constructed as to be movable in the direction across the optical axis, and a positive lens element of the lens elements constituting the first lens group satisfies the following conditions:

$1.43 \leq n_d \leq 1.65$ $65 \leq v_d \leq 95$ $0.302 \leq \theta_{FCd} \leq 0.309$ where $n_d$ is the refractive index with respect to the d-line, $n_F$ is the refractive index with respect to the F-line, $n_c$ is the refractive index with respect to the C-line, $v_d$ is the Abbe number with respect to the d-line, and $\theta_{FCd}$ is the partial dispersion ratio expressed by $(n_d-n_c)/(n_F-n_c)$.

Generally, in the case of correcting a fluctuation in the image position due to the shake or the like by displacing a certain lens unit in the direction substantially orthogonal to the optical axis, if the down-sizing of the whole optical system is attained by reducing the number of the lens elements constituting the image position correcting lens unit, the imaging performance when correcting the image position is inferior to the imaging performance before correcting the image position.

According to the present invention, in a lens layout of a telephoto type optical system, there are discovered the conditions for ensuring the sufficient imaging performance in terms of practical use even when correcting the image position.

Hereinbelow, the conditional expressions will be explained in greater detail.

According to this invention, each positive lens element among the lens elements constituting the first lens group satisfies the following conditional expressions (1) to (3):

$$1.43 \leq n_d \leq 1.65 \qquad (1)$$

$$65 \leq v_d \leq 95 \qquad (2)$$

$$0.302 \leq \theta_{FCd} \leq 0.309 \qquad (3)$$

where $n_d$: the refractive index with respect to the d-line ($\lambda$=587.6 nm), $v_d$: the Abbe number with respect to the d-line, and $\theta_{FCd}$: the partial dispersion ratio.

Note that the partial dispersion ratio $\theta_{FCd}$ is expressed by the following formula:

$$\theta_{FCd} = (n_d - n_c)/(n_F - n_c) \qquad (a)$$

where $n_F$: the refractive index with respect to the F-line ($\lambda$=486.1 nm), and $n_c$: the refractive index with respect to the C-line ($\lambda$=656.3 nm).

The conditional expressions (1) through (3) provide conditions for prescribing proper ranges of the refractive index, the Abbe number and the partial dispersion ratio with respect to each positive lens element among the lens elements constituting the first lens group, making the mass productivity preferable and compensating the secondary chromatic aberration well.

In the telephoto type optical system based on the inner focus method, or the rear focus method, the movable lens group having negative refracting power magnifies an aberration of the fixed lens group having positive refracting power. Hence, for preferably compensating the chromatic aberration with respect to the whole optical system, it is of importance to compensate the chromatic aberration of the fixed lens group having the positive refracting power as much as possible by itself. That is, each positive lens of the first lens group is required to satisfy the above conditional expressions (1) through (3) in order to adequately compensate the chromatic aberration that will otherwise probably turn out to be a critical defect to the telephoto lens.

For obtaining a much better imaging performance, according to the present invention, it is preferable that the following conditional expression (4) be satisfied:

$$0.2 \leq \phi_1/|\phi_2| \leq 1.5 \qquad (4)$$

where $\phi_1$: the refracting power of the first lens group, and $\phi_2$: the refracting power of the second lens group.

The conditional expression (4) prescribes a proper range of a ratio of the refracting power of the first lens group to the refracting power of the second lens group.

If the upper limit value of the conditional expression (4) is violated, an entire length of the optical system undesirably becomes too large.

Whereas if the lower limit value of the conditional expression (4) is violated, there is an undesirable increase in fluctuations both in spherical aberration and in astigmatism due to focusing.

Further, for simplifying a construction of the drive actuator for displacing the image position correcting lens group in the direction orthogonal to the optical axis, it is preferable that the image position correcting lens group be fixed in the optical-axis direction when focusing. Thus, the image position correcting lens unit is fixed in the optical-axis direction when focusing, thereby making it possible to divide the hardware structure into a focusing group and an image position correcting group. A degree of freedom of the design therefore increases.

Also, if all the positive lens elements of the first lens group are made of the same glass material, a single-item mass production of the optical glass can be attained, and, desirably, a reduction in unit price per lens can be expected.

On the other hand, the aberration when correcting the image position is well compensated, and much better imaging performance is obtained. For this purpose, it is desirable that the closest-to-object positive lens of the image position correcting lens group satisfies the following conditional expressions (5) through (7):

$$1.43 \leq n_d' \leq 1.65 \qquad (5)$$

$$65 \leq v_d' \leq 95 \qquad (6)$$

$$0.302 \leq \theta_{FCd}' \leq 0.311 \qquad (7)$$

where $n_d'$: the refractive index with respect to the d-line, $v_d'$: the Abbe number with respect to the d-line, and $\theta_{FCd}'$: the partial dispersion ratio.

Note that the partial dispersion ratio $\theta_{FCd}'$ is expressed by the following formula (b):

$$\theta_{FCd}' = (n_d' - n_c')/(n_F' - n_c') \qquad (b)$$

where $n_F'$: the refractive index with respect to the F-line ($\lambda$=486.1 nm), and $n_c'$: the refractive index with respect to the C-line ($\lambda$=656.3 nm).

The conditional expressions (5) through (7) provide conditions for prescribing proper ranges of the partial dispersion ratio, the Abbe number and the refractive index of the closes-to-object positive lens of the image position correcting lens group as well as for compensating the aberration well when correcting the image position.

When deviating from the conditions of the conditional expressions (5) through (7), there is an undesirable increase in an asymmetric component of a chromatic coma when correcting the image position. Note that a lower limit of the conditional expression (5) is more preferably 1.48, and an upper limit thereof is more preferably 1.63. Further, an upper limit of the conditional expression (7) is more preferably 0.309.

According to the present invention, the aperture stop is disposed preferably in the vicinity of the image position correcting lens group.

Herein, it is desirable for the image position correcting lens group to be constituted by a small number of lens elements and that the image position correcting lens group be disposed in the vicinity of a position where a bundle of rays image-formed along the periphery of the picture intersect the optical axis. This is because a bundle of rays image-formed at the center of the picture are in close proximity to the bundle of rays image-formed along the periphery of the picture, and, therefore, the spherical aberration rather than an aberration relative to a view angle may be concentratedly compensated.

Further, it is desirable for improving a balance of the lateral aberration along the periphery of the picture that the aperture stop be disposed in a position where substantially the center of the bundle of rays image-formed along the periphery of the picture intersects the optical axis.

From the above, according to the present invention, it is desirable that the aperture stop be disposed in the vicinity of the image position correcting lens group.

Also, for simplifying the layout of the lens elements, the optical system is desirably constructed of the first lens group having the positive refracting power and the second lens group having the negative refracting power, which is defined as a minimum structure of the telephoto type optical system. In this case, the focusing is effected by the second lens group having the negative refracting power, and it is desirable that the image position be corrected by displacing a part of lens subunits of the first lens group fixed during the focusing in the direction orthogonal to the optical axis.

Further, for increasing the aperture of the optical system and attaining the down-sizing by decreasing the entire length thereof, it is desirable that the optical system be constructed of the first lens group having the positive refracting power, the second lens group having the negative refracting power and the third lens group having the positive refracting power. In this instance, the focusing is conducted by the second lens group having the negative refracting power, while the image position is corrected by the third lens group having the positive refracting power.

Moreover, it is desirable for simplifying the assembly that the drive actuator for correcting the image position be constructed integrally with the aperture stop.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Each of the image position correcting optical systems in accordance with first to third embodiments of the present invention is constructed of, sequentially from an object side, a first lens group G1 having positive refracting power, a second lens group G2 having negative refracting power and a third lens group G3 having positive refracting power. When focusing, the first and third lens groups G1, G3 are fixed, while the second lens group G2 moves along an optical axis. Then, the third lens group G3 is moved in a direction substantially orthogonal to the optical axis, thus correcting an image position. As explained above, the image position correcting optical system in the first to third embodiments is defined as an optical system of an inner focus telephoto type which has a positive/negative/positive refracting power layout.

On the other hand, each of image position correcting optical systems in accordance with fourth to sixth embodiments is constructed of, sequentially from the object side, the first lens group G1 having positive refracting power and the second lens group G2 having negative refracting power. Then, the first lens group G1 consists of a front lens group G11 having positive refracting power and a rear lens group G12 having positive refracting power. When focusing, the first lens group G1 is fixed, while the second lens group G2 moves along the optical axis. Each of the image position correcting optical systems in accordance with the fourth through sixth embodiments corrects the image position by moving the rear lens group G12 of the first lens group G1 in the direction substantially orthogonal to the optical axis. As described above, each of the image position correcting optical systems in the fourth through sixth embodiments is an optical system of a rear focus telephoto type which has a positive/negative refracting power layout.

The respective embodiments of the present invention will hereinafter be discussed with reference to the accompanying drawings.

[First Embodiment]

Figure 1:
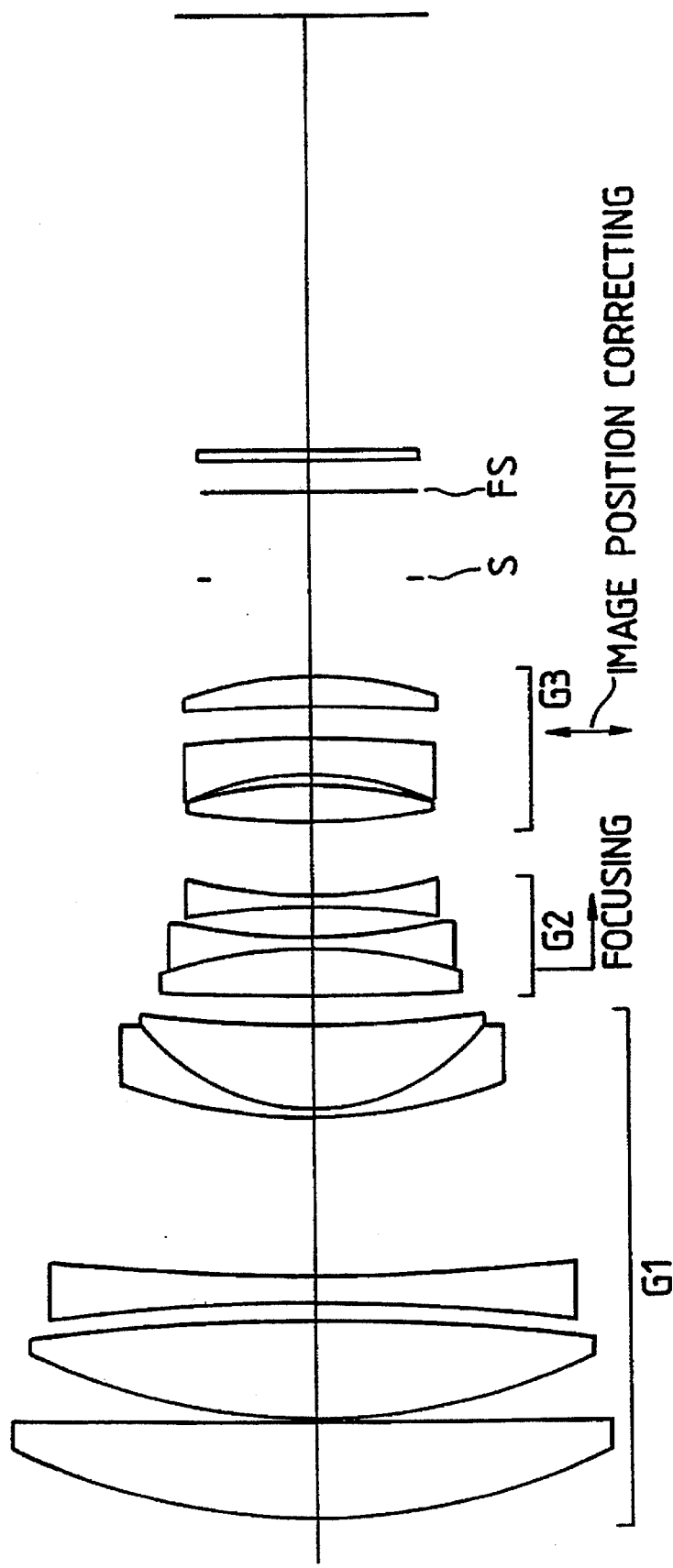
FIG. 1 is a view illustrating a configuration of an image position correcting optical system in accordance with a first embodiment of the present invention.

FIG. 1 is a view illustrating a configuration of the image position correcting optical system in accordance with the first embodiment of this invention.

The illustrated image position correcting optical system is constructed of, sequentially from the object, a first lens group G1 including a positive meniscus lens with its convex surface toward the object side, a biconvex lens, a biconcave lens and a cemented lens having a negative meniscus lens with its convex surface toward the object side and a positive meniscus lens with its convex surface toward the object side, a second lens group G2 including a cemented lens of a biconvex lens and a biconcave lens and a biconcave lens and a third lens group G3 including a negative meniscus lens with its concave surface toward the object side and a positive meniscus lens with its concave surface toward the object side.

Note that an aperture stop S, a fixed stop FS and a filter are provided on the image side of the third lens group G3.

Referring to FIG. 1, the second lens group G2 is so formed as to be movable in a direction along the optical axis. The focusing is performed by moving this second lens unit along the optical axis. Further, the third lens group G3 is so formed as to be movable in the direction substantially orthogonal to the optical axis. Then, an unillustrated drive actuator moves this third lens group G3 in the direction substantially orthogonal to the optical axis, thereby correcting a shake of the image position that is attributed to a vibration of the optical system. As this type of drive actuator, there can be applied an actuator disclosed in U.S. Ser. No. 08/628,192 (a continuation of Ser. No. 08/417,473, abandoned, which is a continuation of Ser. No. 08/129,580, abandoned, which a continuation of Ser. No. 07/853,256), abandoned, which is assigned to the same assignee as the present application, and the disclosure of which is hereby incorporated by reference.

The following Table 1 shows values of data in the first embodiment of the present invention. In Table 1, f designates the focal length in an infinity focusing state, and $F_{No}$ represents the F-number in the infinity focusing state. Further, the numeral at the left end denotes the order of each lens surface from the object side, r designates the radius of curvature of each lens surface, d represents the interval between the lens surfaces, n and ν respectively designate the refractive index with respect to the d-line ($\lambda$=587.6 nm) and the Abbe number, and $\theta_{FCd}$ represents the partial dispersion ratio.

TABLE 1 f = 297
$F_{NO}$ = 2.88

| | r | d | ν | n | $\theta_{FCd}$ |
|---|---|---|---|---|---|
| 1 | 113.388 | 17.600 | 82.52 | 1.49782 | 0.305 |
| 2 | 1895.819 | 0.800 | | | |
| 3 | 110.302 | 18.100 | 82.52 | 1.49782 | 0.305 |
| 4 | −392.025 | 3.500 | | | |
| 5 | −331.110 | 4.700 | 35.19 | 1.74950 | |
| 6 | 402.263 | 28.300 | | | |
| 7 | 90.170 | 2.200 | 55.60 | 1.69680 | |
| 8 | 38.696 | 15.000 | 69.98 | 1.51860 | 0.308 |
| 9 | 213.858 | (d9 = variable) | | | |
| 10 | 473.173 | 8.400 | 33.89 | 1.80384 | |
| 11 | −78.249 | 2.000 | 60.64 | 1.60311 | |
| 12 | 99.260 | 5.100 | | | |
| 13 | −160.670 | 2.000 | 52.30 | 1.74810 | |
| 14 | 69.079 | (d14 = variable) | | | |
| 15 | 146.496 | 6.900 | 69.98 | 1.51860 | 0.308 |
| 16 | −69.633 | 1.600 | | | |
| 17 | −50.657 | 6.500 | 25.50 | 1.80458 | |
| 18 | −200.310 | 5.500 | | | |
| 19 | −295.036 | 5.600 | 28.19 | 1.74000 | |
| 20 | −64.431 | 17.700 | | | |
| 21 | ∞ | 16.000 | | | |
| 22 | ∞ | 5.500 | | | |
| 23 | ∞ | 2.000 | 64.10 | 1.51680 | |
| 24 | ∞ | 77.700 | | | |

(Variable interval when focusing)
 Infinity  Closest Focusing Distance ($\beta$ = −0.13)

TABLE 1-continued

| d9 | 5.34955 | 14.57183 |
|---|---|---|
| d14 | 13.91878 | 4.69650 |

(Condition Corresponding Values)
$\phi_1$ = 1/145.00597 = 0.00690
$|\phi_2|$ = 1/57.96812 = 0.01725

| | | | |
|---|---|---|---|
| (1) $n_d$ = | 1.498 | 1.498 | 1.519 |
| (2) $\nu_d$ = | 82.5 | 82.5 | 70.0 |
| (3) $\theta_{FCd}$ = | 0.305 | 0.305 | 0.308 |
| (4) $\phi_1 / |\phi_2|$ = | 0.400 | | |
| (5) $n_d'$ = | 1.519 | | |
| (6) $\nu_d'$ = | 70.0 | | |
| (7) $\theta_{FCd}'$ = | 0.308 | | |

Note that $n_d$, $\nu_d$ and $\theta_{FCd}$ indicate condition corresponding values in the sequence of the first, second and third positive lenses from the object side of the first lens group.

(Image position correcting data)

| | Infinity Focusing State | Closest Focusing State |
|---|---|---|
| Image Position Correcting Displacement Quantity | 1.0 mm (Maximum) | 1.0 mm (Maximum) |
| Corresponding Image Moving Quantity | +1.0 mm (Maximum) | +1.0 mm (Maximum) |

Note that the plus sign of the image moving quantity indicates that the image moves in the same direction as a displacement direction of the image position correcting lens group.

Figure 2:
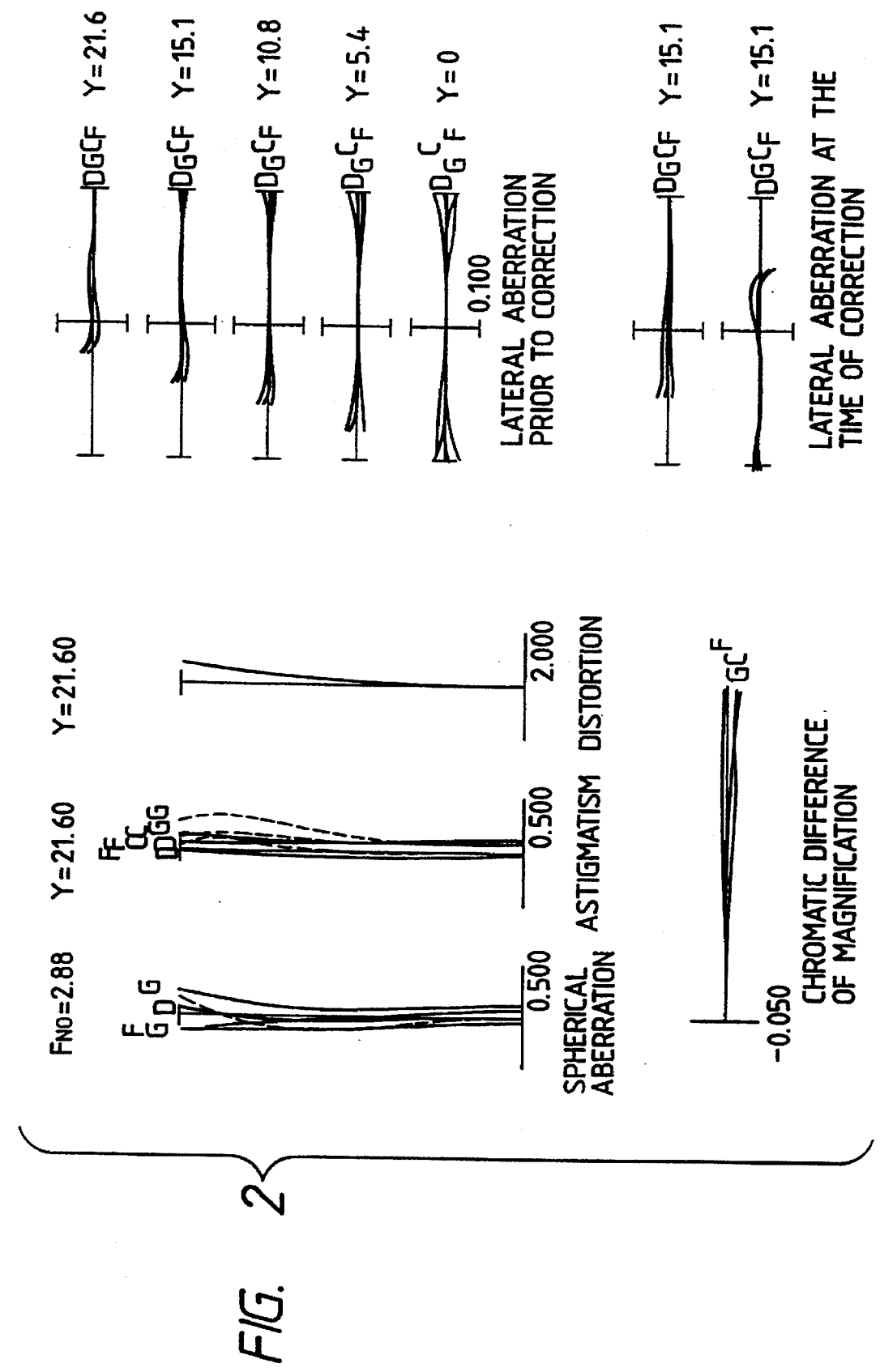
FIG. 2 is a diagram showing a variety of aberrations in an infinity focusing state in the first embodiment of FIG. 1.
Figure 3:
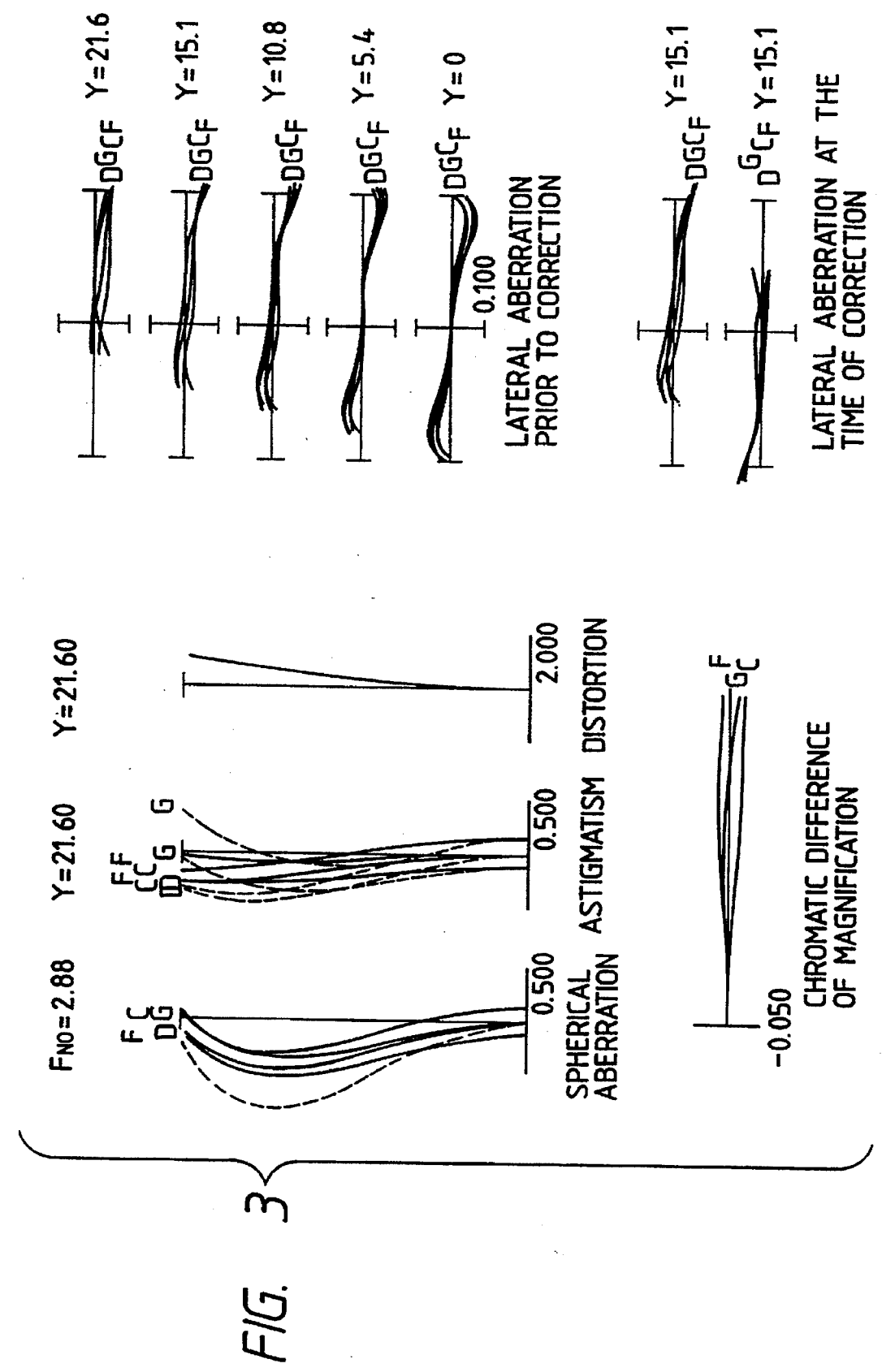
FIG. 3 is a diagram showing the various aberrations in a closest focusing state in the first embodiment of FIG. 1.

FIGS. 2 and 3 are diagrams respectively showing various aberrations in the infinity focusing state and in the closest focusing state. Referring to the individual aberration diagrams, $F_{NO}$ represents the F-number, Y designates the image height, D denotes the d-line ($\lambda$=587.6 nm), C designates the C-line ($\lambda$=656.3 nm), F indicates the F-line ($\lambda$=486.1 nm), and G represents the g-line ($\lambda$=435.6 nm).

Note that the solid line represents the sagittal image surface, and the broken line indicates the meridional image surface in the aberration diagram showing an astigmatism. Further, the broken line represents the sine condition in the aberration diagram illustrating a spherical aberration. In the aberration diagram showing a chromatic difference of magnification, the d-line is fiducial.

Moreover, in the aberration diagram illustrating a lateral aberration when correcting the image position, the image position correcting displacement quantity is 1 mm at the maximum.

As is obvious from the respective aberration diagrams, it can be understood that the various aberrations are well compensated including the time when correcting the image position in accordance with this embodiment.

[Second Embodiment]

Figure 4:
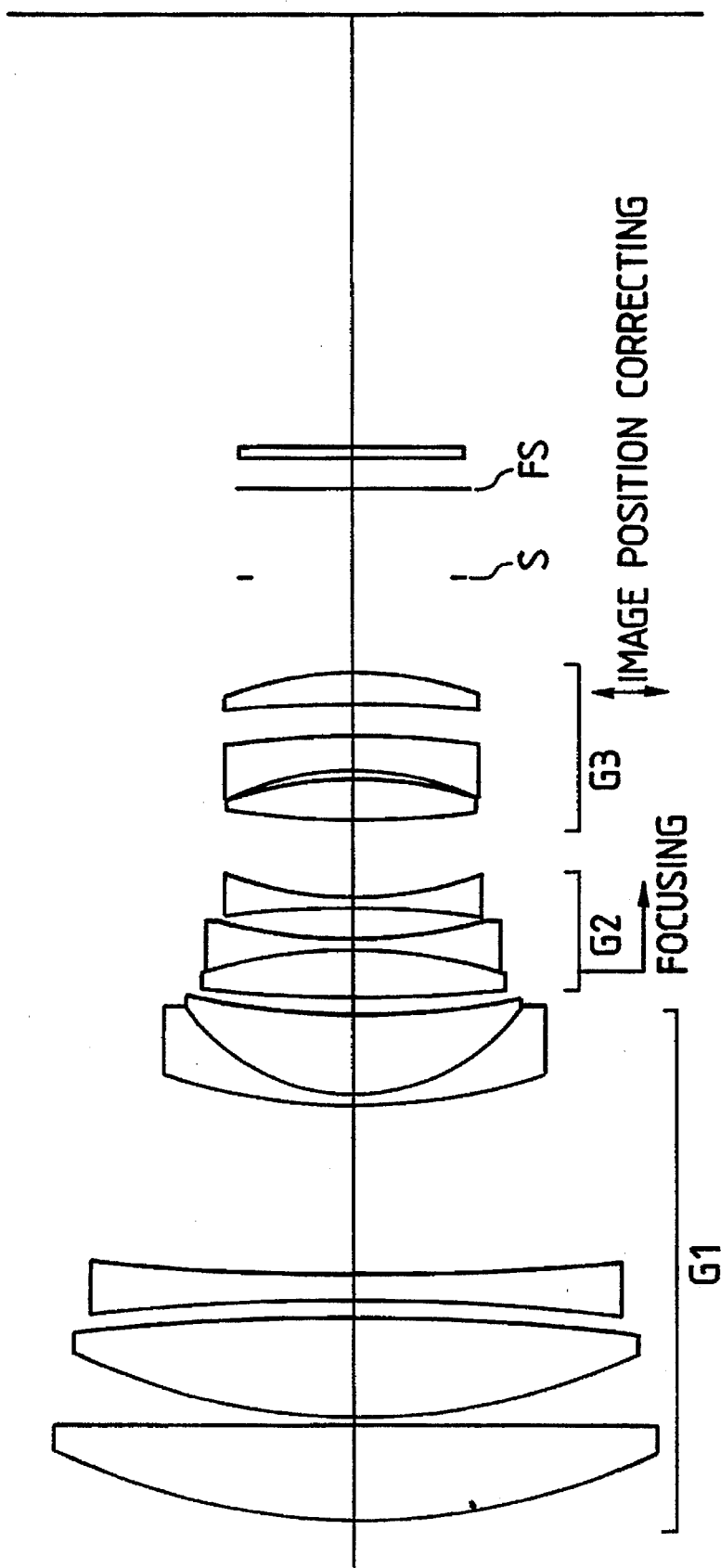
FIG. 4 is a view illustrating a configuration of the image position correcting optical system in a second embodiment of the present invention.

FIG. 4 is a view illustrating a configuration of the image position correcting optical system in accordance with the second embodiment of this invention.

The illustrated image position correcting optical system is constructed of, sequentially from the object, a first lens group G1 including a positive meniscus lens with its convex surface toward the object side, a biconvex lens, a biconcave lens and a cemented lens having a negative meniscus lens with its convex surface toward the object side and a positive meniscus lens with its convex surface toward the object side, a second lens group G2 including a cemented lens having a biconvex lens and a biconcave lens and a biconcave lens and a third lens group G3 including a biconvex lens, a negative meniscus lens with its concave surface toward the object side and a positive meniscus lens with its concave surface toward the object side.

Note that the aperture stop S, the fixed stop FS and the filter are provided on the image side of the third lens group G3.

Referring to FIG. 4, the second lens group G2 is so formed as to be movable in the direction along the optical axis. The focusing is performed by moving this second lens group along the optical axis. Further, the third lens group G3 is so formed as to be movable in the direction substantially orthogonal to the optical axis. Then, the unillustrated drive actuator, in the same way as in the first embodiment discussed above, moves this third lens group G3 in the direction substantially orthogonal to the optical axis, thereby correcting the shake of the image position that is attributed to the vibration of the optical system.

The image position correcting optical system in the second embodiment has the same configuration as the image position correcting optical system in the first embodiment discussed above, but the refracting power and the shape in each lens unit are different.

The following Table 2 shows values of data in the second embodiment of the present invention. In Table 2, f designates the focal length in an infinity focusing state, and $F_{NO}$ represents the F-number in the infinity focusing state. Further, the numeral at the left end denotes the order of each lens surface from the object side, r designates the radius of curvature of each lens surface, d represents the interval between the lens surfaces, n and ν respectively designate the refractive index with respect to the d-line (λ=587.6 nm) and the Abbe number, and $θ_{FCd}$ represents the partial dispersion ratio.

TABLE 2 f = 297
$F_{NO}$ = 2.88

| | r | d | ν | n | $θ_{FCd}$ |
|---|---|---|---|---|---|
| 1 | 113.713 | 17.600 | 82.52 | 1.49782 | 0.305 |
| 2 | 6080.230 | 0.500 | | | |
| 3 | 107.910 | 18.100 | 94.97 | 1.43875 | 0.307 |
| 4 | −391.820 | 3.600 | | | |
| 5 | −337.603 | 4.700 | 35.19 | 1.74950 | |
| 6 | 556.672 | 30.100 | | | |
| 7 | 98.675 | 2.200 | 55.60 | 1.69680 | |
| 8 | 35.118 | 15.000 | 67.87 | 1.59319 | 0.303 |
| 9 | 162.573 | (d9 = variable) | | | |
| 10 | 455.161 | 8.400 | 33.89 | 1.80384 | |
| 11 | −78.338 | 2.000 | 60.64 | 1.60311 | |
| 12 | 99.362 | 5.100 | | | |
| 13 | −163.088 | 2.000 | 52.30 | 1.74810 | |
| 14 | 68.110 | (d14 = variable) | | | |
| 15 | 146.892 | 6.900 | 69.98 | 1.51860 | 0.308 |
| 16 | −70.772 | 1.600 | | | |
| 17 | −51.780 | 6.500 | 25.50 | 1.80458 | |
| 18 | −195.577 | 5.500 | | | |
| 19 | −307.115 | 5.600 | 28.19 | 1.74000 | |
| 20 | −66.527 | 17.700 | | | |
| 21 | ∞ | 16.000 | | | |
| 22 | ∞ | 5.500 | | | |
| 23 | ∞ | 2.000 | 64.10 | 1.51680 | |
| 24 | ∞ | 77.2952 | | | |

(Variable interval when focusing)
| | Infinity | Closest Focusing Distance (β = −0.13) |
|---|---|---|
| d9 | 3.51504 | 12.73732 |
| d14 | 14.34629 | 5.12401 |

TABLE 2-continued (Condition Corresponding Values)
$φ_1$ = 1/145.00516 = 0.00690
$|φ_2|$ = 1/57.96812 = 0.01725

| | | | |
|---|---|---|---|
| (1) $n_d$ = | 1.498 | 1.439 | 1.593 |
| (2) $ν_d$ = | 82.5 | 95.0 | 67.9 |
| (3) $θ_{FCd}$ = | 0.305 | 0.307 | 0.303 |
| (4) $|φ_1 / φ_2|$ = | 0.400 | | |
| (5) $n_d'$ = | 1.519 | | |
| (6) $ν_d'$ = | 70.0 | | |
| (7) $θ_{FCd}'$ = | 0.308 | | |

Note that $n_d$, $ν_d$ and $θ_{FCd}$ indicate the condition corresponding values in the sequence of the first, second and third positive lenses from the object side of the first lens group.

(Image position correcting data)

| | Infinity Focusing State | Closest Focusing State |
|---|---|---|
| Image Position Correcting Displacement Quantity | 1.0 mm (Maximum) | 1.0 mm (Maximum) |
| Corresponding Image Moving Quantity | +1.0 mm (Maximum) | +1.0 mm (Maximum) |

Note that the plus sign of the image moving quantity indicates that the image moves in the same direction as the displacement direction of the image position correcting lens group.

Figure 5:
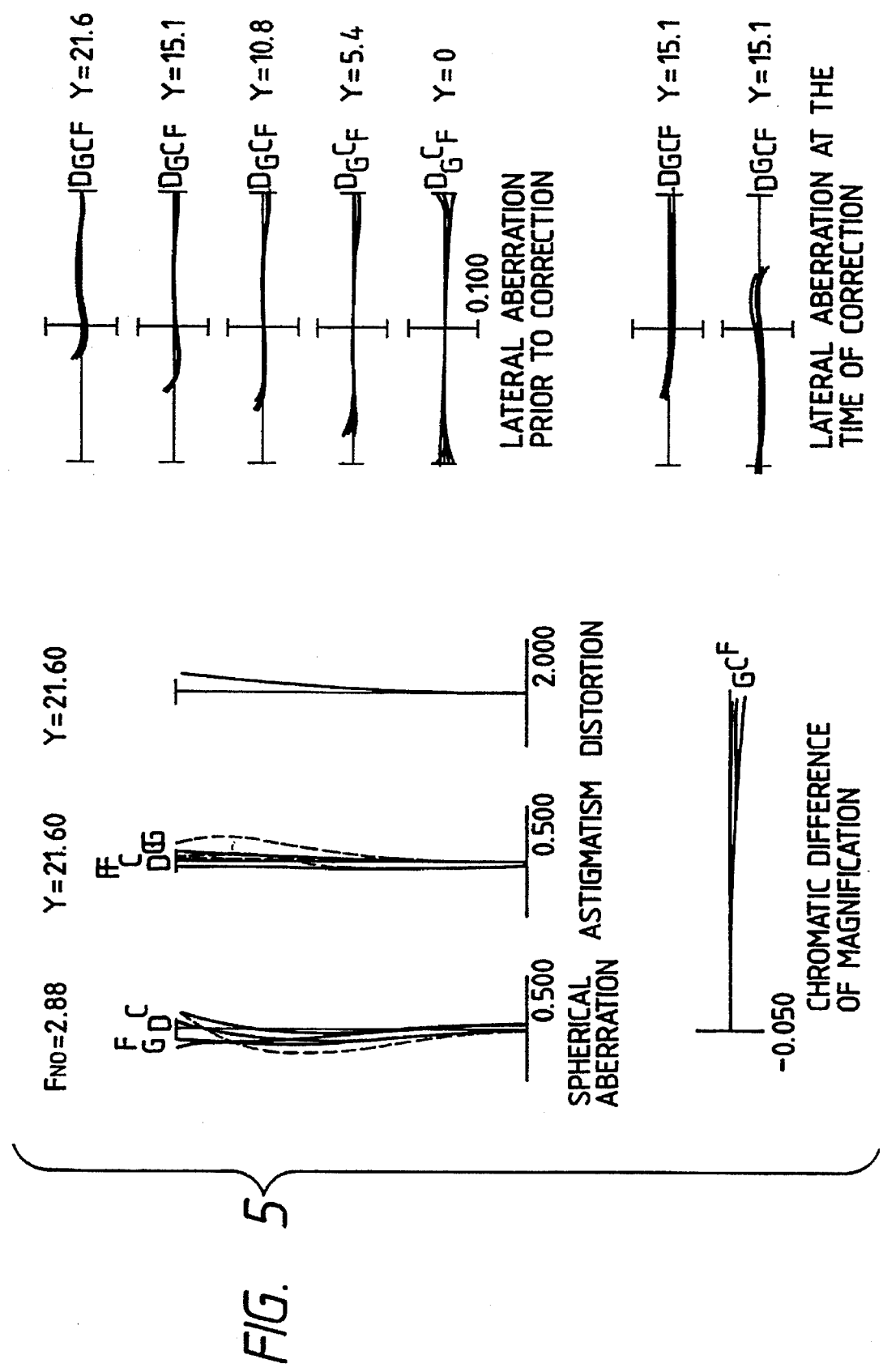
FIG. 5 is a diagram showing the various aberrations in the infinity focusing state in the second embodiment of FIG. 4.
Figure 6:
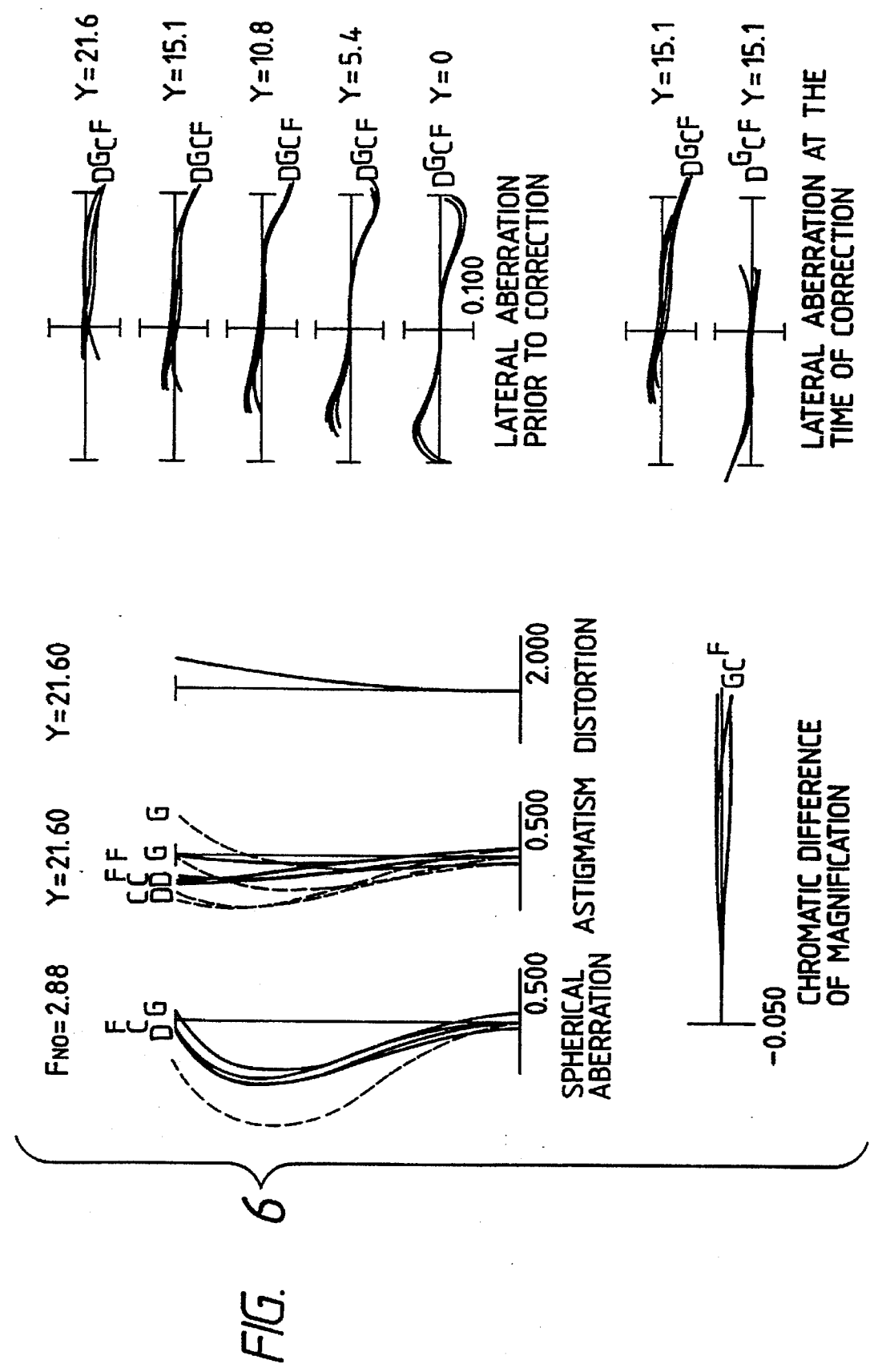
FIG. 6 is a diagram showing the various aberrations in the closest focusing state in the second embodiment of FIG. 4.

FIGS. 5 and 6 are diagrams respectively showing various aberrations in the infinity focusing state and in the closest focusing state. Referring to the individual aberration diagrams, $F_{NO}$ represents the F-number, Y designates the image height, D denotes the d-line (λ=587.6 nm), C denotes the C-line (λ=656.3 nm), F represents the F-line (λ=486.1 nm), and G represents the g-line (λ=435.6 nm).

Note that the solid line represents the sagittal image surface, and the broken line indicates the meridional image surface in the aberration diagram showing the astigmatism. Further, the broken line represents the sine condition in the aberration diagram illustrating the spherical aberration. In the aberration diagram showing the chromatic difference of magnification, the d-line is fiducial.

Moreover, in the aberration diagram illustrating the lateral aberration when correcting the image position, the image position correcting displacement quantity is 1 mm at the maximum.

As is obvious from the respective aberration diagrams, it can be understood that the various aberrations are well compensated including the time when correcting the image position in accordance with this embodiment.

[Third Embodiment]

Figure 7:
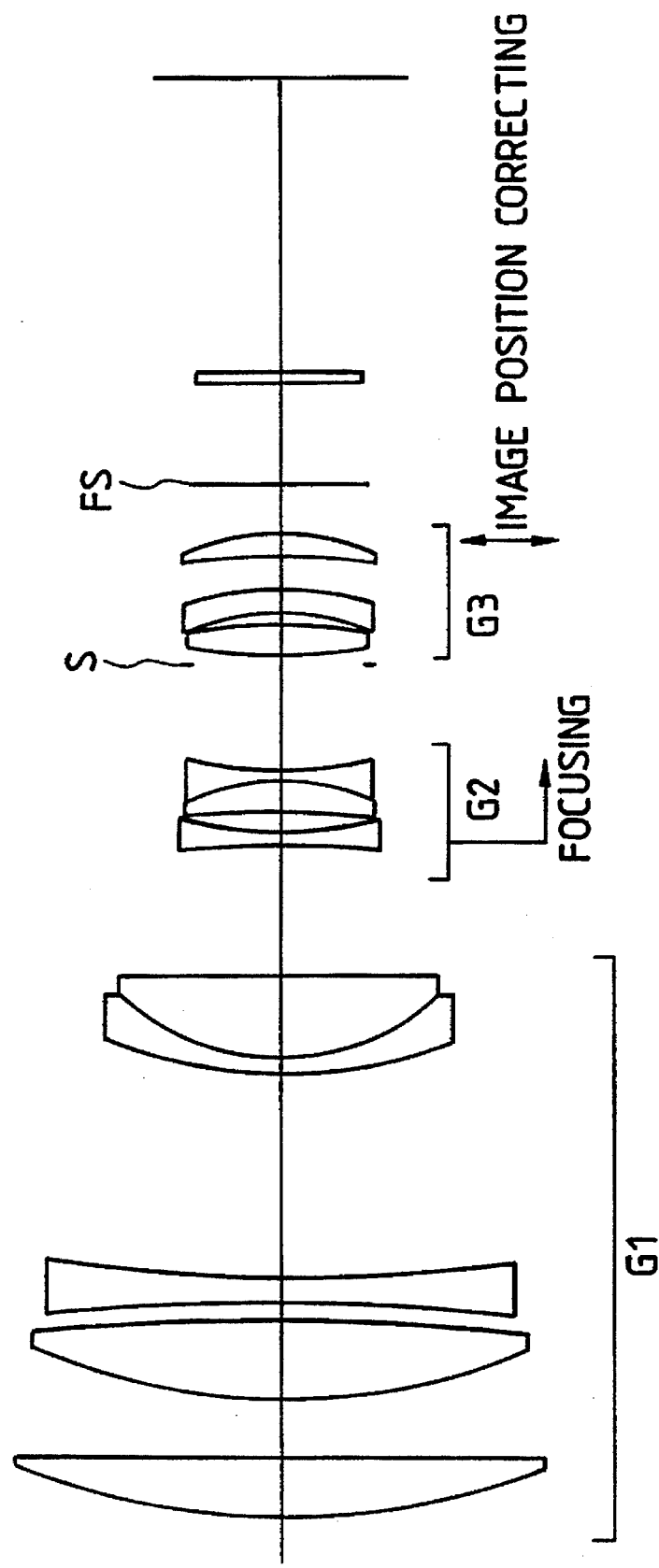
FIG. 7 is a view illustrating a configuration of the image position correcting optical system in a third embodiment of the present invention.

FIG. 7 is a view illustrating a configuration of the image position correcting optical system in accordance with the third embodiment of this invention.

The illustrated image position correcting optical system is constructed of, sequentially from the object, a first lens group G1 including a positive meniscus lens with its convex surface toward the object side, a biconvex lens, a biconcave lens and a cemented lens having a negative meniscus lens with its convex surface toward the object side and a positive meniscus lens with its convex surface toward the object side, a second lens group G2 including a biconcave lens and a cemented lens having a positive meniscus lens with its concave surface toward the object side and a biconvex lens and a third lens group G3 including a biconvex lens, a negative meniscus lens with its concave surface toward the object side and a positive meniscus lens with its concave surface toward the object side.

Note that the aperture stop S is provided between the second lens group G2 and the third lens group G3, while the fixed stop FS and the filter are provided on the image side of the third lens group G3.

Referring to FIG. 7, the second lens group G2 is so formed as to be movable in the direction along the optical axis. The focusing is performed by moving this second lens group along the optical axis. Further, the third lens group G3 is so formed as to be movable in the direction substantially orthogonal to the optical axis. Then, the unillustrated drive actuator, in the same way as in the first embodiment discussed above, moves this third lens group G3 in the direction substantially orthogonal to the optical axis, thereby correcting the shake of the image position that is attributed to the vibration of the optical system.

The image position correcting optical system in the third embodiment has the same configuration as the image position correcting optical system in the first embodiment discussed above, but the refracting power and the shape in each lens group are different. Note that all the positive lenses of the first lens group G1 are composed of the same glass in this embodiment.

The following Table 3 shows values of data in the third embodiment of the present invention. In Table 3, f designates the focal length in an infinity focusing state, and $F_{NO}$ represents the F-number in the infinity focusing state. Further, the numeral at the left end denotes the order of each lens surface from the object side, r designates the radius of curvature of each lens surface, d represents the interval between the lens surfaces, n and ν respectively designate the refractive index with respect to the d-line (λ=587.6 nm) and the Abbe number, and $\theta_{FCd}$ represents the partial dispersion ratio.

TABLE 3 f = 588
$F_{NO}$ = 2.88

| | r | d | ν | n | $\theta_{FCd}$ |
|---|---|---|---|---|---|
| 1 | 281.150 | 23.400 | 82.52 | 1.49782 | 0.305 |
| 2 | 11960.780 | 24.200 | | | |
| 3 | 253.845 | 30.600 | 82.52 | 1.49782 | 0.305 |
| 4 | −826.472 | 7.400 | | | |
| 5 | −749.631 | 9.800 | 40.90 | 1.79631 | |
| 6 | 721.627 | 83.000 | | | |
| 7 | 175.498 | 7.000 | 52.30 | 1.74810 | |
| 8 | 93.064 | 32.000 | 82.52 | 1.49782 | 0.305 |
| 9 | 17702.829 | (d9 = variable) | | | |
| 10 | −332.270 | 4.600 | 54.01 | 1.61720 | |
| 11 | 145.367 | 7.400 | | | |
| 12 | −544.504 | 12.600 | 33.89 | 1.80384 | |
| 13 | −75.204 | 4.600 | 54.01 | 1.61720 | |
| 14 | 131.023 | (d14 = variable) | | | |
| 15 | ∞ | 6.000 | (stop) | | |
| 16 | 296.071 | 10.600 | 69.98 | 1.51860 | 0.308 |
| 17 | −145.438 | 5.000 | | | |
| 18 | −76.183 | 9.400 | 33.89 | 1.80384 | |
| 19 | −114.376 | 13.200 | | | |
| 20 | −258.532 | 9.000 | 65.77 | 1.46450 | |
| 21 | −90.765 | 19.600 | | | |
| 22 | ∞ | 41.400 | | | |
| 23 | ∞ | 4.000 | 64.10 | 1.51680 | |
| 24 | ∞ | 35.024 | | | |
| 25 | ∞ | 83.999 | | | |

(Variable interval when focusing)

TABLE 3-continued

| | Infinity | Closest Focusing Distance (β = −0.14) |
|---|---|---|
| d9 | 53.87566 | 75.70128 |
| d14 | 43.03719 | 21.21157 |

(Condition Corresponding Values)
$\phi_1$ = 1/301.99141 = 0.00331
$|\phi_2|$ = 1/98.00000 = 0.00102

| | | | |
|---|---|---|---|
| (1) $n_d$ = | 1.498 | 1.498 | 1.498 |
| (2) $\nu_d$ = | 82.5 | 82.5 | 82.5 |
| (3) $\theta_{FCd}$ = | 0.305 | 0.305 | 0.305 |
| (4) $\phi_1 / |\phi_2|$ = | 0.324 | | |
| (5) $n_d'$ = | 1.519 | | |
| (6) $\nu_d'$ = | 70.0 | | |
| (7) $\theta_{FCd}'$ = | 0.308 | | |

Note that $n_d$, $\nu_d$ and $\theta_{FCd}$ indicate the condition corresponding values in the sequence of the first, second and third positive lenses from the object side of the first lens group.

| (Image position correcting data) | | |
|---|---|---|
| | Infinity Focusing State | Closest Focusing State |
| Image Position Correcting Displacement Quantity | 2.0 mm (Maximum) | 2.0 mm (Maximum) |
| Corresponding Image Moving Quantity | +2.0 mm (Maximum) | +2.0 mm (Maximum) |

Note that the plus sign of the image moving quantity indicates that the image moves in the same direction as the displacement direction of the image position correcting lens unit.

Figure 8:
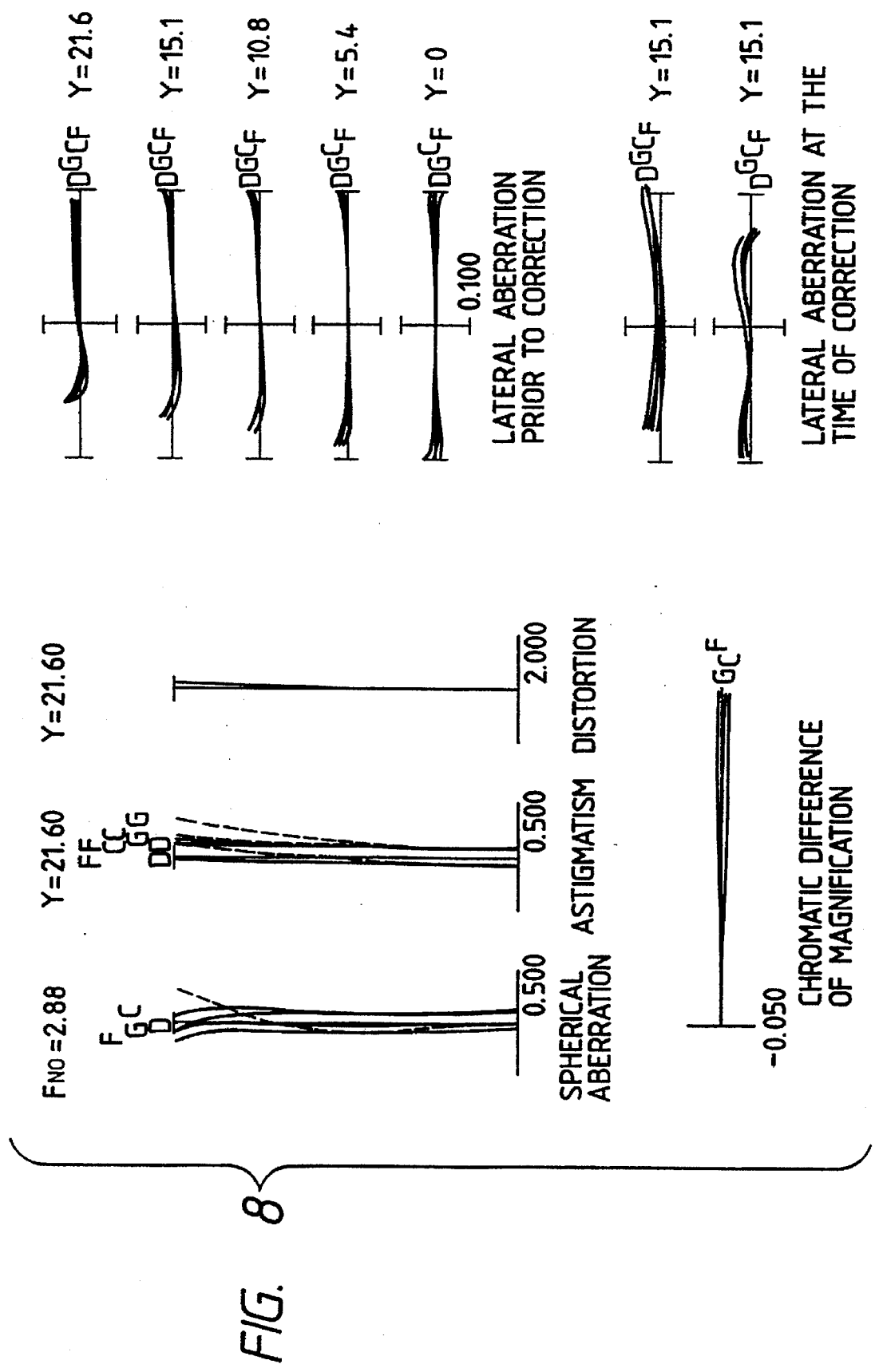
FIG. 8 is a diagram showing the various aberrations in the infinity focusing state in the third embodiment of FIG. 7.
Figure 9:
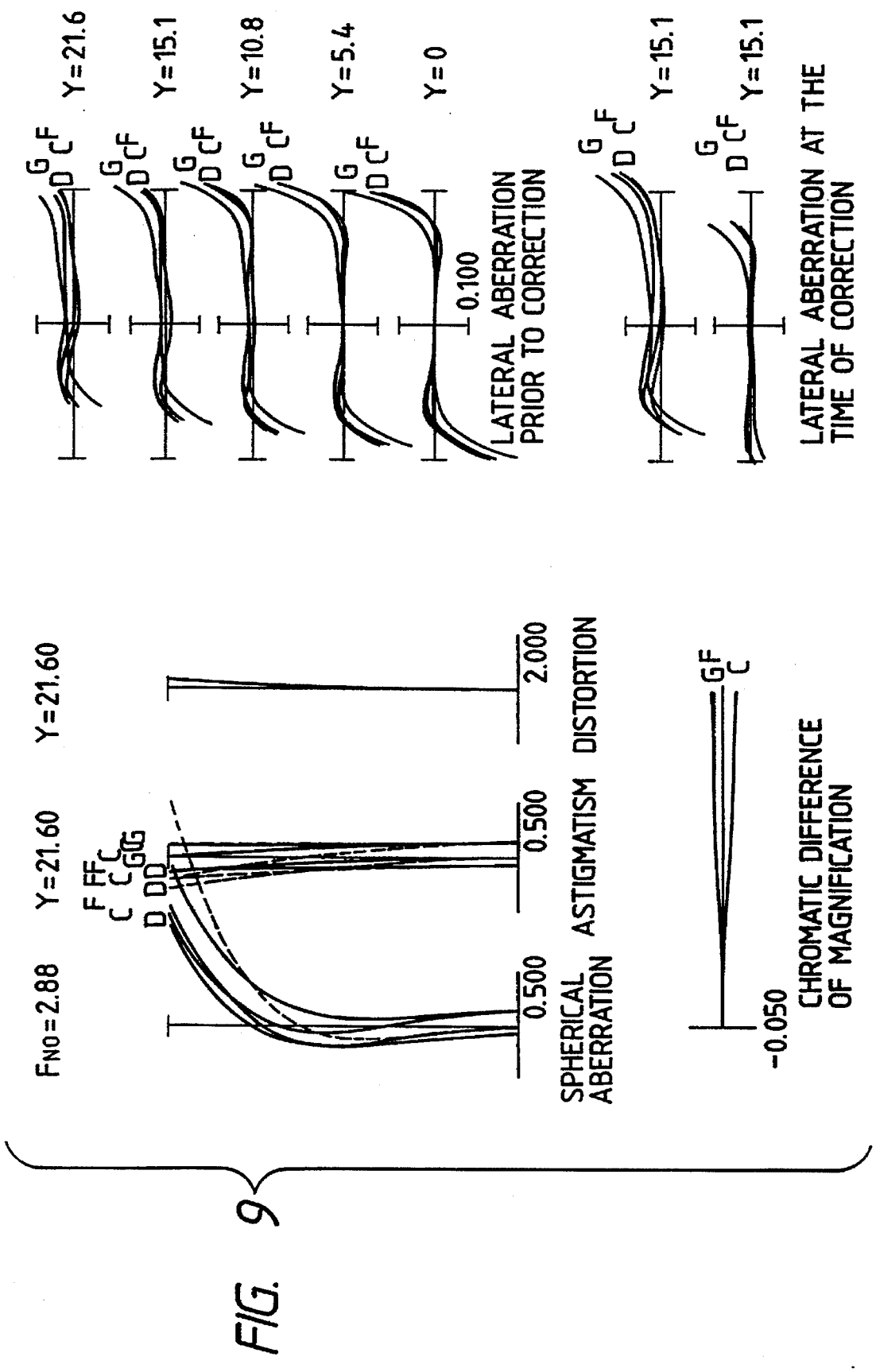
FIG. 9 is a diagram showing the various aberrations in the closest focusing state in the third embodiment of FIG. 7.

FIGS. 8 and 9 are diagrams respectively showing various aberrations in the infinity focusing state and in the closest focusing state. Referring to the individual aberration diagrams, $F_{NO}$ represents the F-number, Y designates the image height, D denotes the d-line (λ=587.6 nm), C denotes the C-line (λ=656.3 nm), F represents the F-line (λ=486.1 nm), and G represents the g-line (λ=435.6 nm).

Note that the solid line represents the sagittal image surface, and the broken line indicates the meridional image surface in the aberration diagram showing the astigmatism. Further, the broken line represents the sine condition in the aberration diagram illustrating the spherical aberration. In the aberration diagram showing the chromatic difference of magnification, the d-line is fiducial.

Moreover, in the aberration diagram illustrating the lateral aberration when correcting the image position, the image position correcting displacement quantity is 2 mm at the maximum.

As is obvious from the respective aberration diagrams, it can be understood that the various aberrations are well compensated including the time when correcting the image position in accordance with this embodiment.

[Fourth Embodiment]

Figure 10:
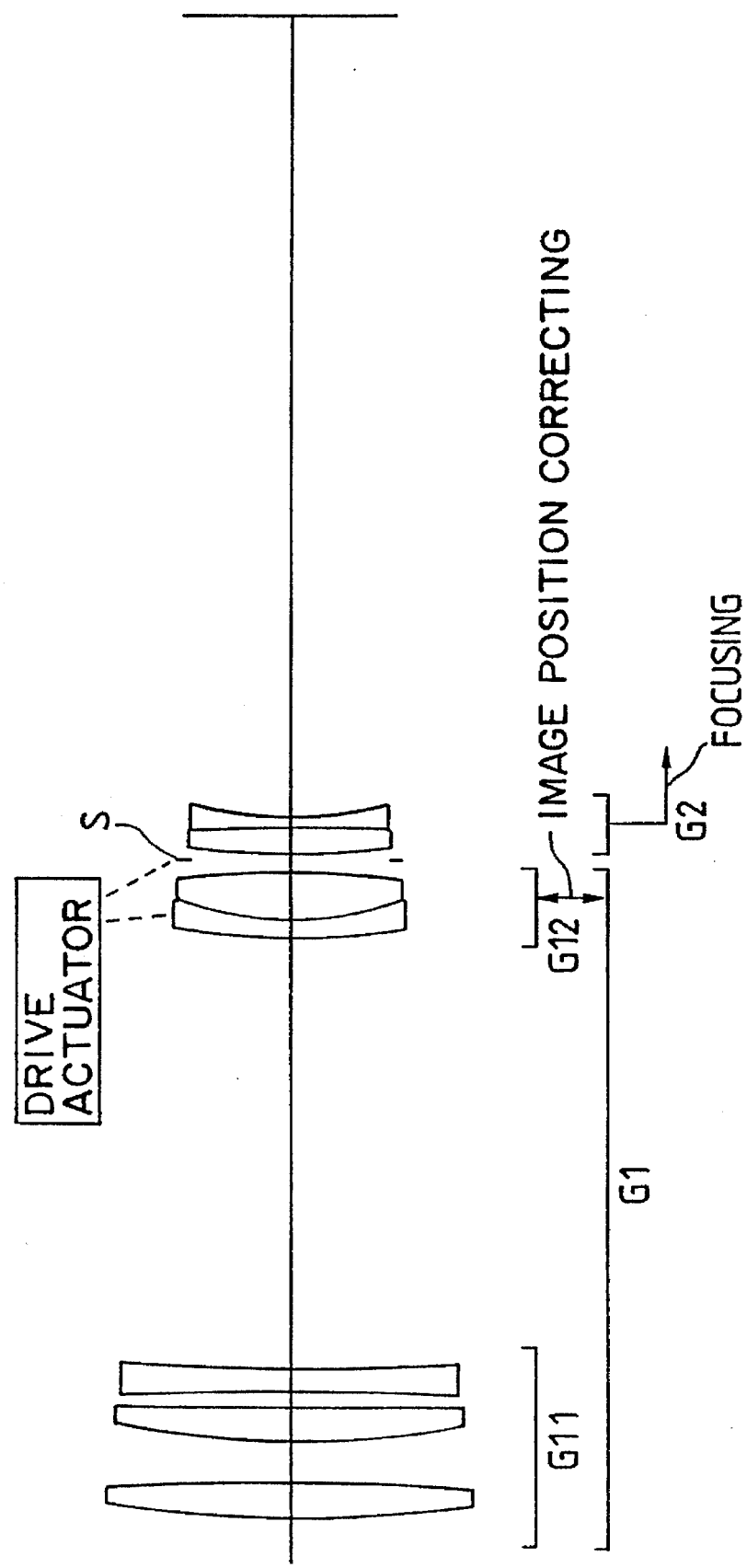
FIG. 10 is a view illustrating a configuration of the image position correcting optical system in a fourth embodiment of the present invention.

FIG. 10 is a view illustrating a configuration of the image position correcting optical system in accordance with the fourth embodiment of this invention.

The illustrated image position correcting optical system is constructed of, sequentially from the object, a first lens group G1 consisting of a front lens group G11 including a biconvex lens, a positive meniscus lens with its convex surface toward the object side and a biconcave lens and a rear lens unit G12 including a cemented lens having a negative meniscus lens with its convex surface toward the object side and a biconvex lens and a second lens unit G2 including a cemented lens having a biconvex lens and a biconcave lens.

Note that the aperture stop S is provided between the first lens group G1 and the second lens unit G2.

Referring to FIG. 10, the second lens unit G2 is so formed as to be movable in the direction along the optical axis. The focusing is performed by moving this second lens unit along the optical axis. Further, the rear lens unit G12 of the first lens group G1 is so formed as to be movable in the direction substantially orthogonal to the optical axis. Then, the unillustrated drive actuator, in the same way as in the first embodiment discussed above, moves the rear lens unit G12 of the first lens group G1 in the direction substantially orthogonal to the optical axis, thereby correcting the shake of the image position that is attributed to the vibration of the optical system.

Note that all the positive lenses of the first lens group G1 are composed of the same glass in this embodiment.

The following Table 4 shows values of data in the fourth embodiment of the present invention. In Table 4, f designates the focal length in an infinity focusing state, and $F_{NO}$ represents the F-number in the infinity focusing state. Further, the numeral at the left end denotes the order of each lens surface from the object side, r designates the radius of curvature of each lens surface, d represents the interval between the lens surfaces, n and ν respectively designate the refractive index with respect to the d-line (λ=587.6 nm) and the Abbe number, and $θ_{FCd}$ represents the partial dispersion ratio.

TABLE 4 f = 500
$F_{NO}$ = 4.50

| | r | d | ν | n | $θ_{FCd}$ |
|---|---|---|---|---|---|
| 1 | 359.710 | 11.000 | 82.52 | 1.49782 | 0.305 |
| 2 | −721.221 | 13.300 | | | |
| 3 | 243.586 | 11.000 | 82.52 | 1.49782 | 0.305 |
| 4 | 1877.620 | 5.300 | | | |
| 5 | −763.325 | 7.000 | 33.89 | 1.80384 | |
| 6 | 1083.988 | 136.700 | | | |
| 7 | 188.211 | 6.000 | 52.30 | 1.74810 | |
| 8 | 95.823 | 14.000 | 82.52 | 1.49782 | 0.305 |
| 9 | −487.464 | 5.000 | | | |
| 10 | ∞ | (d10 = variable) | (stop) | | |
| 11 | 282.020 | 7.000 | 27.61 | 1.75520 | |
| 12 | −1923.866 | 4.000 | 53.93 | 1.71300 | |
| 13 | 118.267 | (d13 = variable) | | | |

(Variable interval when focusing)

| | Infinity | Closest Focusing Distance (β = −0.11) |
|---|---|---|
| d10 | 1.86316 | 28.30228 |
| d13 | 253.12920 | 225.65168 |

(Condition Corresponding Values)
$φ_1$ = 1/277.79717 = 0.00360
$|φ_2|$ = 1/309.90210 = 0.00323

| | | | |
|---|---|---|---|
| (1) $n_d$ = | 1.498 | 1.498 | 1.498 |
| (2) $ν_d$ = | 82.5 | 82.5 | 82.5 |
| (3) $θ_{FCd}$ = | 0.305 | 0.305 | 0.305 |
| (4) $φ_1 / |φ_2|$ = | 1.116 | | |
| (5) $n_d'$ = | 1.498 | | |
| (6) $ν_d'$ = | 82.5 | | |
| (7) $θ_{FCd}'$ = | 0.305 | | |

Note that $n_d$, $ν_d$ and $θ_{FCd}$ indicate the condition corresponding values in the sequence of the first, second and third positive lenses from the object side of the first lens group.

(Image position correcting data)

| | Infinity Focusing State | Closest Focusing State |
|---|---|---|
| Image Position Correcting Displacement Quantity | 1.4 mm (Maximum) | 1.4 mm (Maximum) |
| Corresponding Image Moving Quantity | +1.0 mm (Maximum) | +1.0 mm (Maximum) |

Note that the plus sign of the image moving quantity indicates that the image moves in the same direction as the displacement direction of the image position correcting lens unit.

Figure 11:
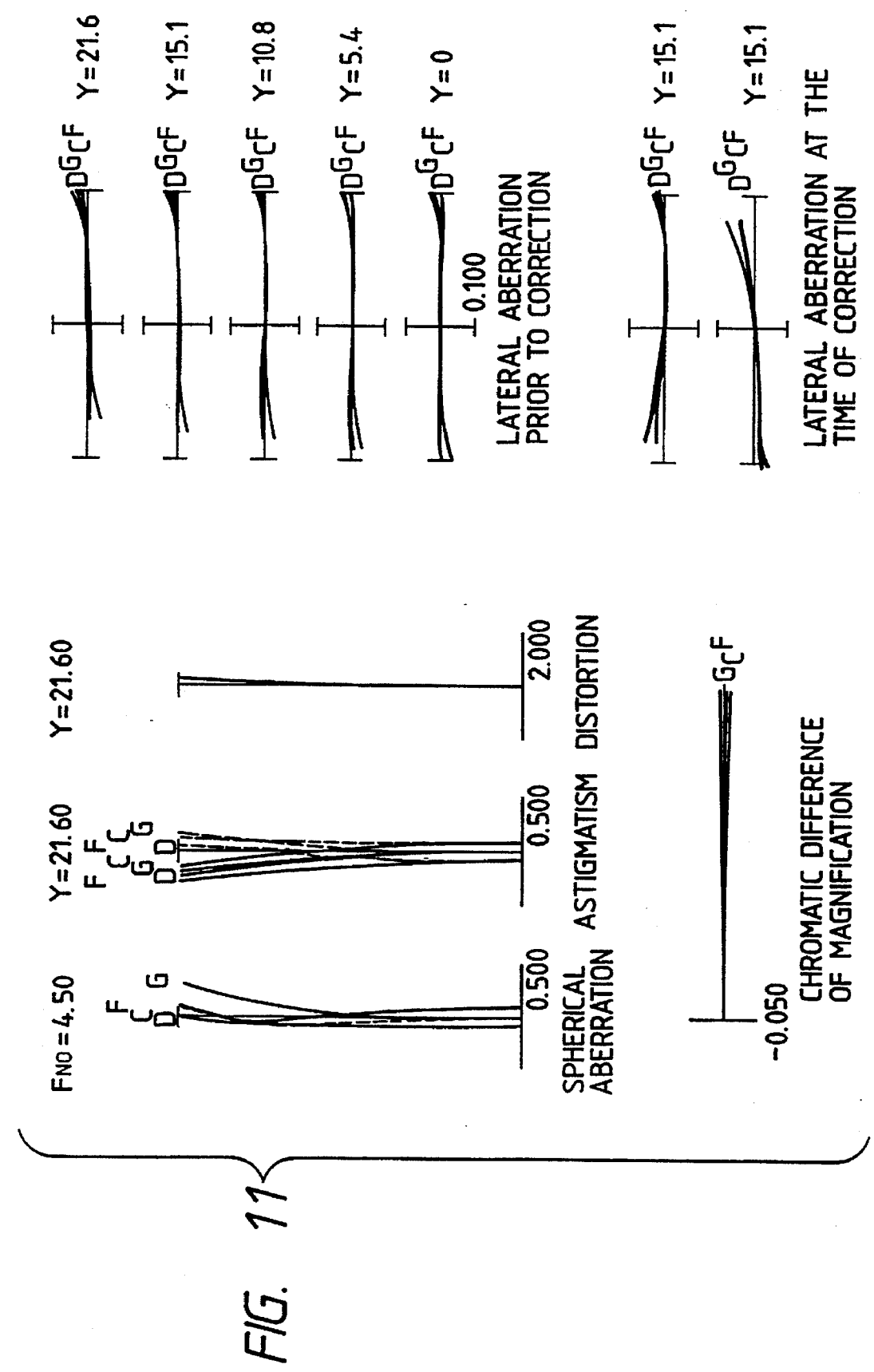
FIG. 11 is a diagram showing the various aberrations in the infinity focusing state in the fourth embodiment of FIG. 10.
Figure 12:
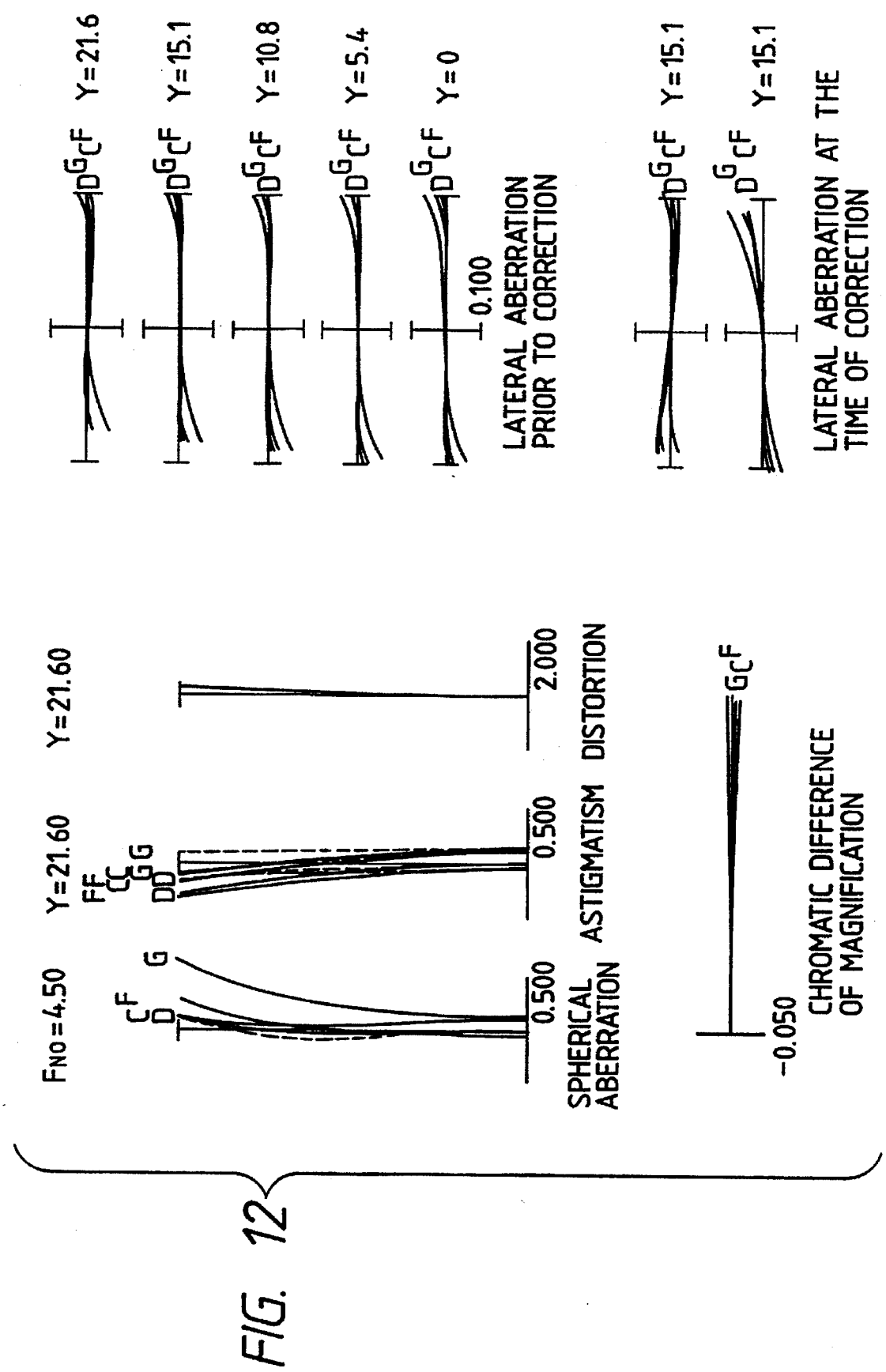
FIG. 12 is a diagram showing the various aberrations in the closest focusing state in the fourth embodiment of FIG. 10.

FIGS. 11 and 12 are diagrams respectively showing various aberrations in the infinity focusing state and in the closest focusing state. Referring to the individual aberration diagrams, $F_{NO}$ represents the F-number, Y designates the image height, D denotes the d-line (λ=587.6 nm), C denotes the C-line (λ=656.3 nm), F represents the F-line (λ=486.1 nm), and G represents the g-line (λ=435.6 nm).

Note that the solid line represents the sagittal image surface, and the broken line indicates the meridional image surface in the aberration diagram showing the astigmatism. Further, the broken line represents the sine condition in the aberration diagram illustrating the spherical aberration. In the aberration diagram showing the chromatic difference of magnification, the d-line is fiducial.

Moreover, in the aberration diagram illustrating the lateral aberration when correcting the image position, the image position correcting displacement quantity is 1.4 mm at the maximum.

As is obvious from the respective aberration diagrams, it can be understood that the various aberrations are well compensated including the time when correcting the image position in accordance with this embodiment.

[Fifth Embodiment]

Figure 13:
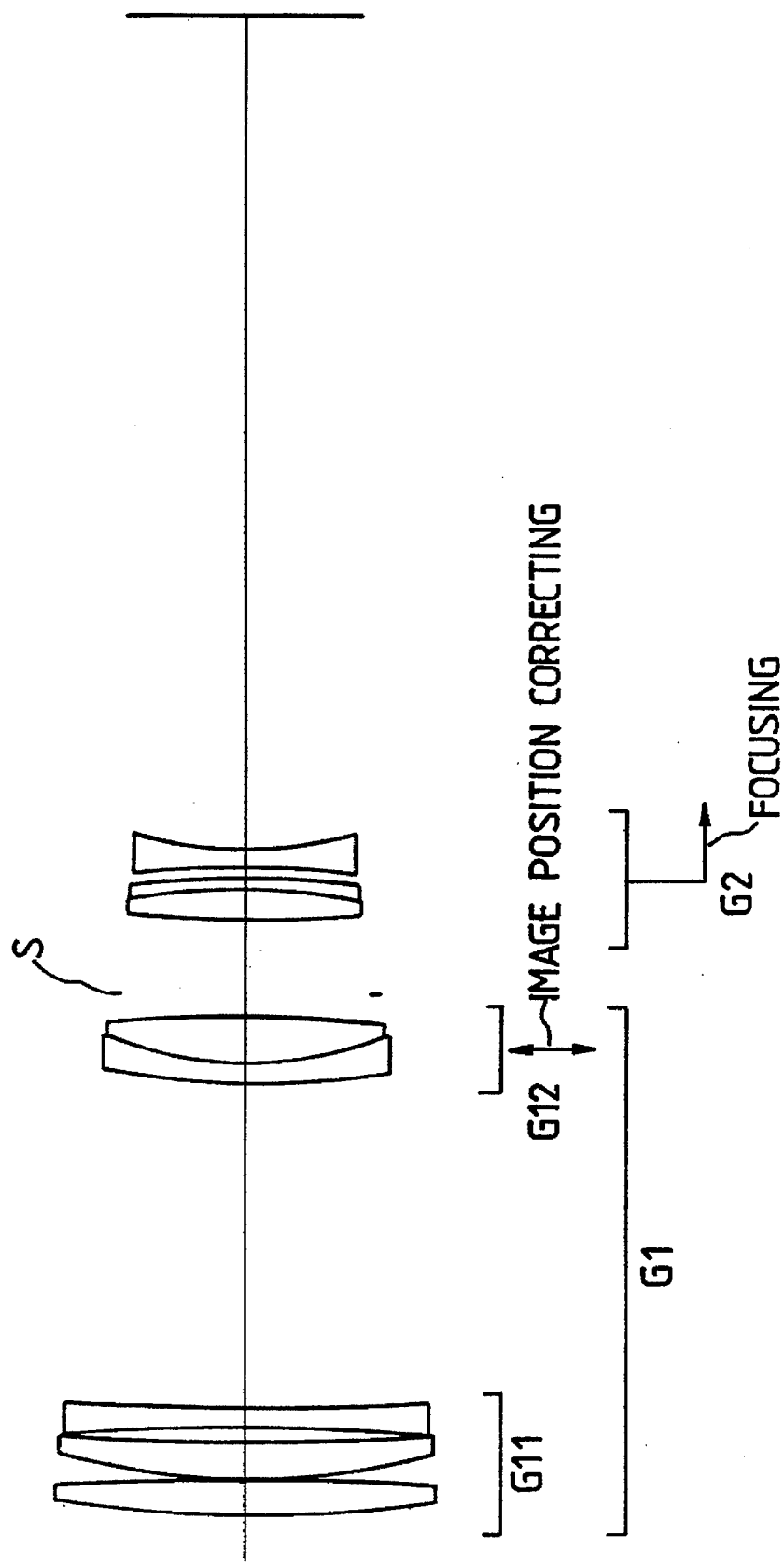
FIG. 13 is a view illustrating a configuration of the image position correcting optical system in a fifth embodiment of the present invention.

FIG. 13 is a view illustrating a configuration of the image position correcting optical system in accordance with the fifth embodiment of this invention.

The illustrated image position correcting optical system is constructed of, sequentially from the object, a first lens group G1 consisting of a front lens group G11 including a biconvex lens, a positive meniscus lens with its convex surface toward the object side and a biconcave lens and a rear lens unit G12 including a cemented lens having a negative meniscus lens with its convex surface toward the object side and a biconvex lens and a second lens group G2 including a cemented lens of a biconvex lens and negative meniscus lens with its concave surface toward the object side and a biconcave lens.

Note that the aperture stop S is provided between the first lens group G1 and the second lens group G2.

Referring to FIG. 13, the second lens group G2 is so formed as to be movable in the direction along the optical axis. The focusing is performed by moving this second lens unit along the optical axis. Further, the rear lens unit G12 of the first lens group G1 is so formed as to be movable in the direction substantially orthogonal to the optical axis. Then, the unillustrated drive actuator, in the same way as in the first embodiment discussed above, moves the rear lens unit G12 of the first lens group G1 in the direction substantially orthogonal to the optical axis, thereby correcting the shake of the image position that is attributed to the vibration of the optical system.

The image position correcting optical system in the fifth embodiment has the same configuration as that of the image position correcting optical system in the fourth embodiment discussed above, but the refracting power and the shape of each lens unit are different. Note that all the positive lenses of the first lens group G1 are composed of the same glass in this embodiment.

The following Table 5 shows values of data in the fifth embodiment of the present invention. In Table 5, f designates the focal length in an infinity focusing state, and $F_{NO}$ represents the F-number in the infinity focusing state. Further, the numeral at the left end denotes the order of each lens surface from the object side, r designates the radius of curvature of each lens surface, d represents the interval between the lens surfaces, n and v respectively designate the refractive index with respect to the d-line ($\lambda$=587.6 nm) and the Abbe number, and $\theta_{FCd}$ represents the partial dispersion ratio.

TABLE 5 f = 500
$F_{NO}$ = 4.50

| | r | d | v | n | $\theta_{PCd}$ |
|---|---|---|---|---|---|
| 1 | 354.655 | 11.000 | 82.52 | 1.49782 | 0.305 |
| 2 | –1065.552 | 0.300 | | | |
| 3 | 220.008 | 11.000 | 82.52 | 1.49782 | 0.305 |
| 4 | 950.837 | 4.000 | | | |
| 5 | –725.711 | 7.000 | 33.89 | 1.80384 | |
| 6 | 1707.433 | 100.000 | | | |
| 7 | 233.153 | 6.000 | 52.30 | 1.74810 | |
| 8 | 106.766 | 14.000 | 82.52 | 1.49782 | 0.305 |
| 9 | –412.376 | 7.000 | | | |
| 10 | ∞ | (d10 = variable) | (stop) | | |
| 11 | 671.262 | 8.000 | 32.17 | 1.67270 | |
| 12 | –229.884 | 4.000 | 54.55 | 1.51454 | |
| 13 | –445.690 | 3.800 | | | |
| 14 | –314.979 | 5.000 | 54.55 | 1.51454 | |
| 15 | 12.678 | (d15 = variable) | | | |

(Variable interval when focusing)

| | Infinity | Closest Focusing Distance ($\beta$ = –0.11) |
|---|---|---|
| d10 | 22.22325 | 48.66237 |
| d15 | 255.32220 | 228.35704 |

(Condition Corresponding Values)
$\phi_1$ = 1/277.79675 = 0.00360
$|\phi_2|$ = 1/309.90423 = 0.00323

| | | | |
|---|---|---|---|
| (1) $n_d$ = | 1.498 | 1.498 | 1.498 |
| (2) $v_d$ = | 82.5 | 82.5 | 82.5 |
| (3) $\theta_{FCd}$ = | 0.305 | 0.305 | 0.305 |
| (4) $\phi_1 / |\phi_2|$ = | 1.116 | | |
| (5) $n_d'$ = | 1.498 | | |
| (6) $v_d'$ = | 82.5 | | |
| (7) $\theta_{FCd}'$ = | 0.305 | | |

Note that $n_d$, $v_d$ and $\theta_{FCd}$ indicate the condition corresponding values in the sequence of the first, second and third positive lenses from the object side of the first lens unit.

(Image position correcting data)

| | Infinity Focusing State | Closest Focusing State |
|---|---|---|
| Image Position Correcting Displacement Quantity | 1.4 mm (Maximum) | 1.4 mm (Maximum) |

-continued (Image position correcting data)

| | Infinity Focusing State | Closest Focusing State |
|---|---|---|
| Corresponding Image Moving Quantity | +1.0 mm (Maximum) | +1.0 mm (Maximum) |

Note that the plus sign of the image moving quantity indicates that the image moves in the same direction as the displacement direction of the image position correcting lens unit.

Figure 14:
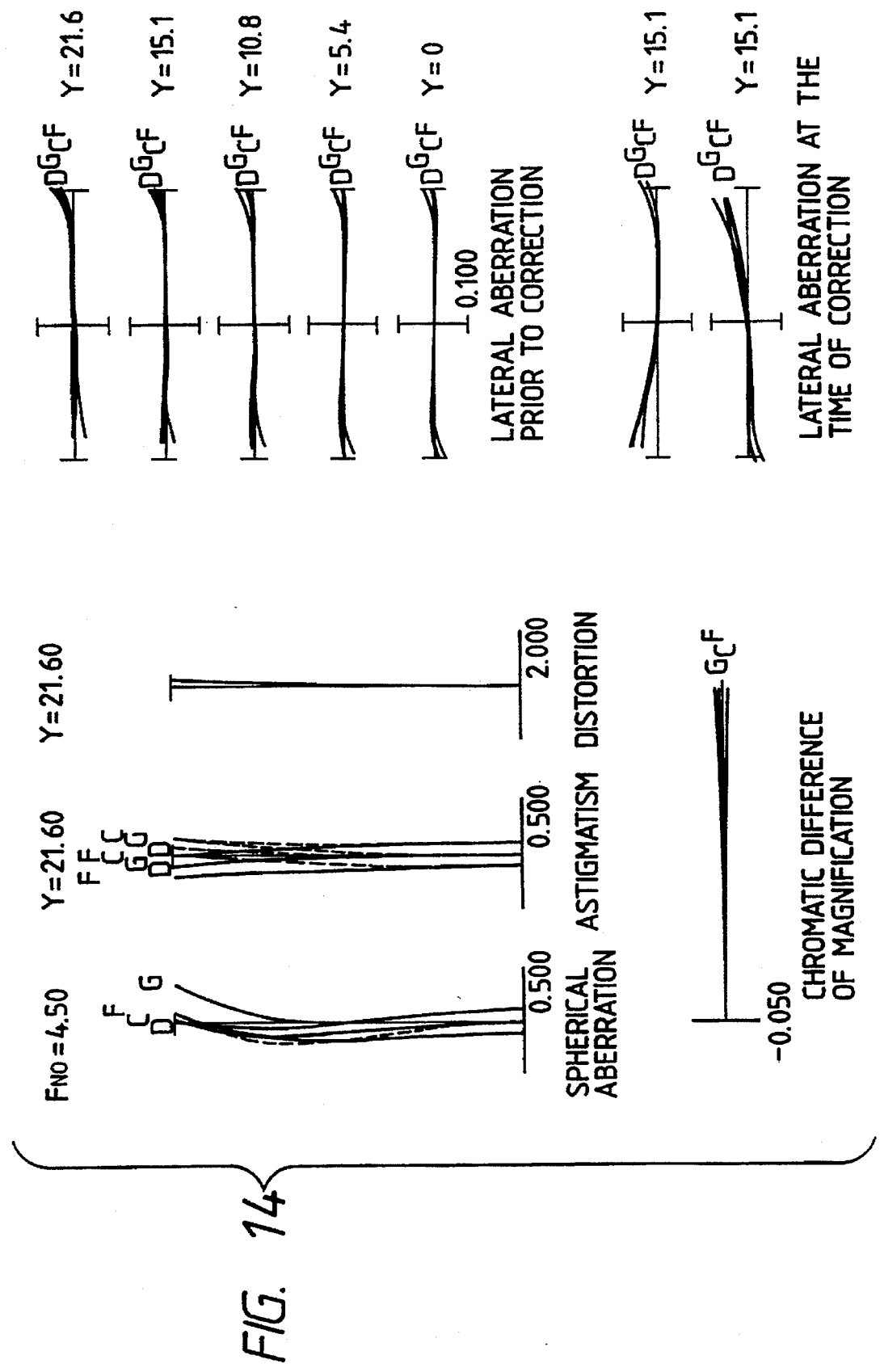
FIG. 14 is a diagram showing the various aberrations in the infinity focusing state in the fifth embodiment of FIG. 13.
Figure 15:
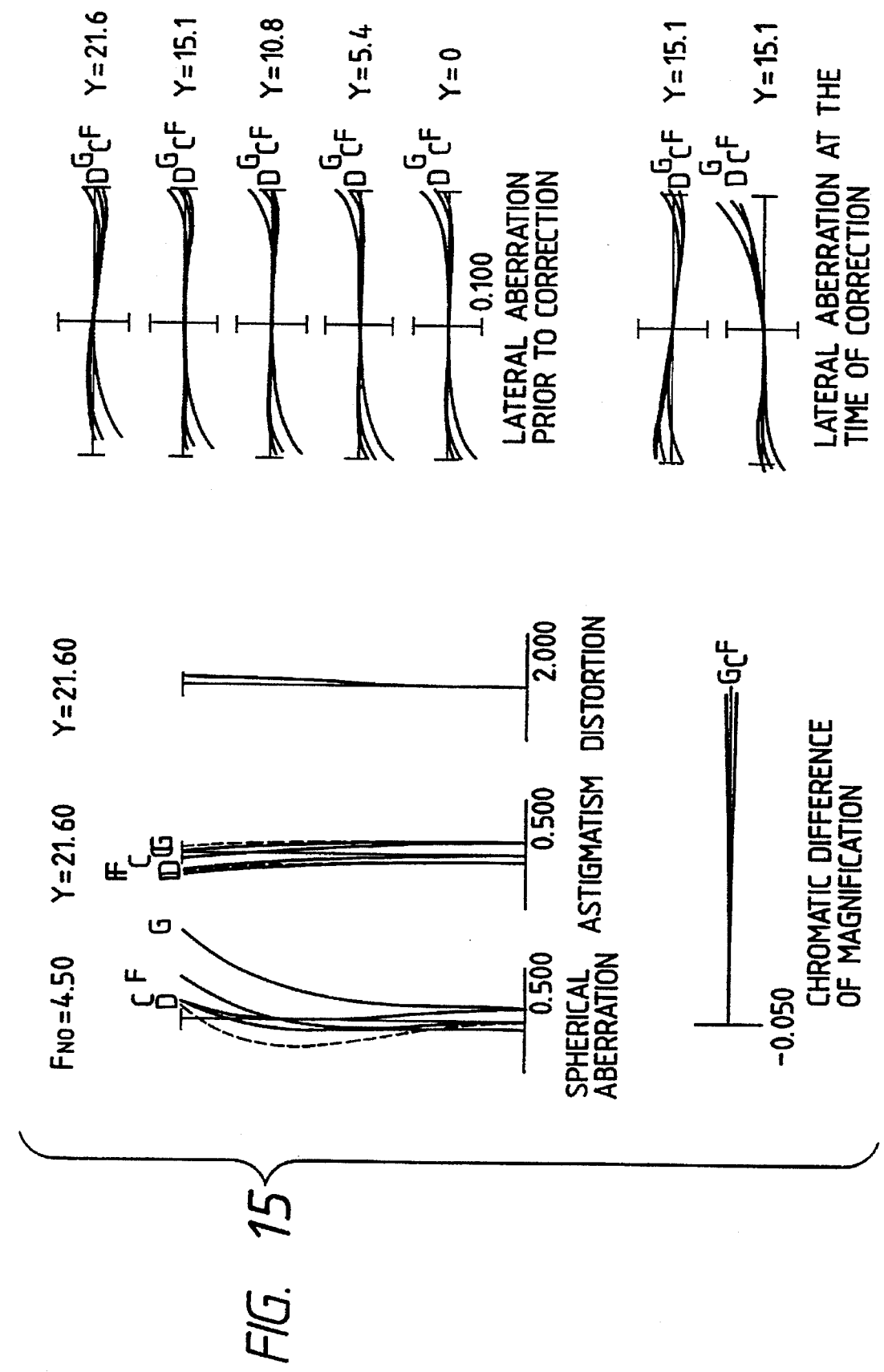
FIG. 15 is a diagram showing the various aberrations in the closest focusing state in the fifth embodiment of FIG. 13.

FIGS. 14 and 15 are diagrams respectively showing various aberrations in the infinity focusing state and in the closest focusing state. Referring to the individual aberration diagrams, $F_{NO}$ represents the F-number, Y designates the image height, D denotes the d-line ($\lambda$=587.6 nm), C denotes the C-line ($\lambda$=656.3 nm), F represents the F-line ($\lambda$=486.1 nm), and G represents the g-line ($\lambda$=435.6 nm).

Note that the solid line represents the sagittal image surface, and the broken line indicates the meridional image surface in the aberration diagram showing the astigmatism. Further, the broken line represents the sine condition in the aberration diagram illustrating the spherical aberration. In the aberration diagram showing the chromatic difference of magnification, the d-line is fiducial.

Moreover, in the aberration diagram illustrating the lateral aberration when correcting the image position, the image position correcting displacement quantity is 1.4 mm at the maximum.

As is obvious from the respective aberration diagrams, it can be understood that the various aberrations are well compensated including the time when correcting the image position in accordance with this embodiment.

[Sixth Embodiment]

Figure 16:
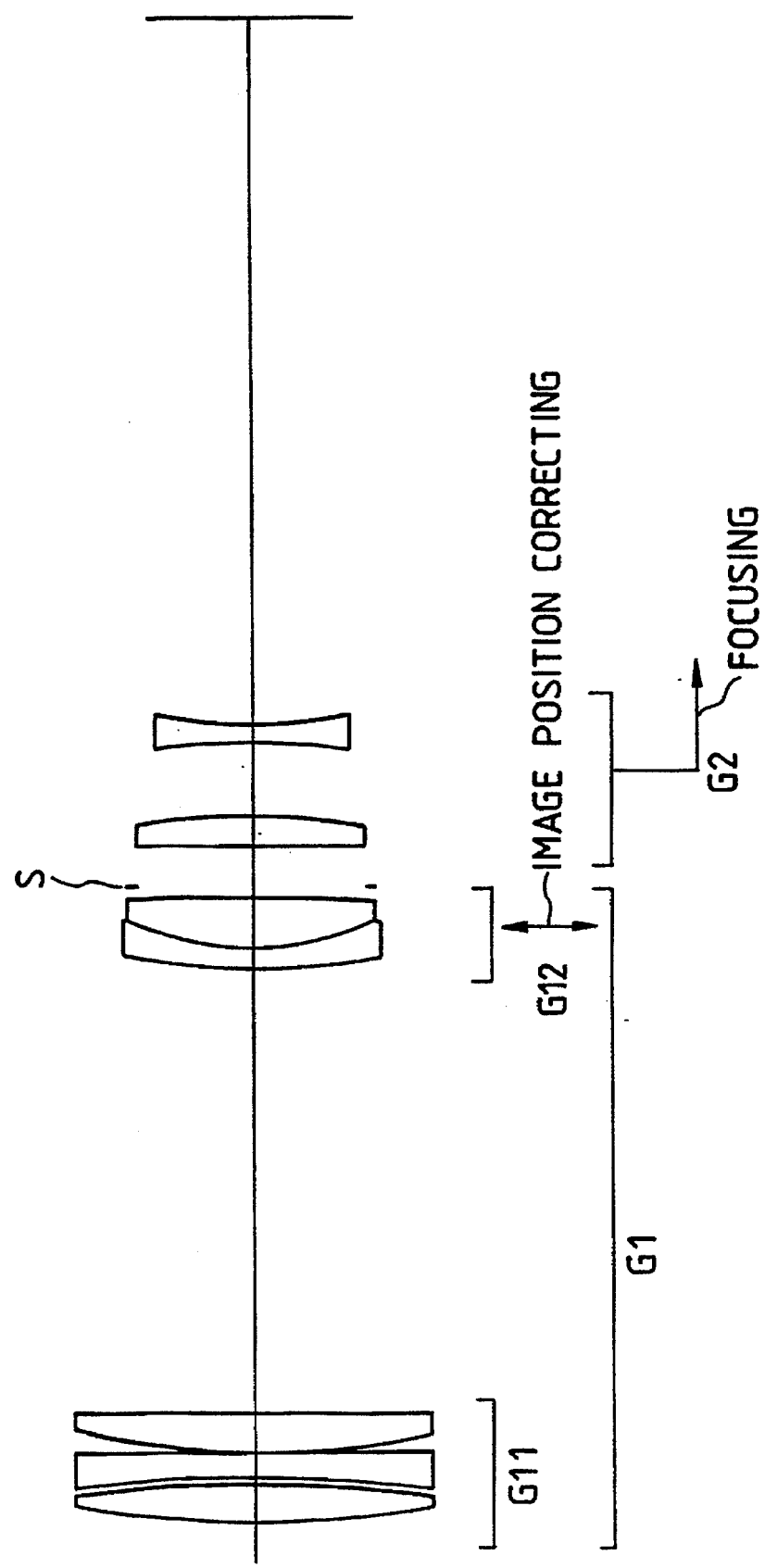
FIG. 16 is a view illustrating a configuration of the image position correcting optical system in a sixth embodiment of the present invention.

FIG. 16 is a view illustrating a configuration of the image position correcting optical system in accordance with the sixth embodiment of this invention.

The illustrated image position correcting optical system is constructed of, sequentially from the object, a first lens group G1 consisting of a front lens group G11 including a biconvex lens, a biconcave lens and a biconvex lens and a rear lens unit G12 including a cemented lens having a negative meniscus lens with its convex surface toward the object side and a biconvex lens and a second lens group G2 including a positive meniscus lens with its concave surface toward the object side and a biconcave lens.

Note that the aperture stop S is provided between the first lens unit G1 and the second lens group G2.

Referring to FIG. 16, the second lens group G2 is so formed as to be movable in the direction along the optical axis. The focusing is performed by moving this second lens unit along the optical axis. Further, the rear lens unit G12 of the first lens group G1 is so formed as to be movable in the direction substantially orthogonal to the optical axis. Then, the unillustrated drive actuator, in the same way as in the first embodiment discussed above, moves the rear lens unit G12 of the first lens group G1 in the direction substantially orthogonal to the optical axis, thereby correcting the shake of the image position that is attributed to the vibration of the optical system.

The image position correcting optical system in the sixth embodiment has the same configuration as that of the image position correcting optical system in the fourth embodiment discussed above, but the refracting power and the shape of each lens unit are different.

The following Table 6 shows values of data in the sixth embodiment of the present invention. In Table 6, f designates the focal length in an infinity focusing state, and $F_{NO}$ represents the F-number in the infinity focusing state. Further, the numeral at the left end denotes the order of each lens surface from the object side, r designates the radius of curvature of each lens surface, d represents the interval between the lens surfaces, n and v respectively designate the refractive index with respect to the d-line (λ=587.6 nm) and the Abbe number, and $\theta_{FCd}$ represents the partial dispersion ratio.

TABLE 6 f = 500
$F_{NO}$ = 4.50

| | r | d | v | n | $\theta_{FCd}$ |
|---|---|---|---|---|---|
| 1 | 295.709 | 12.100 | 82.52 | 1.49782 | 0.305 |
| 2 | −424.620 | 3.000 | | | |
| 3 | −332.634 | 7.700 | 46.54 | 1.80411 | |
| 4 | 3185.473 | 0.100 | | | |
| 5 | 307.788 | 12.100 | 82.52 | 1.49782 | 0.305 |
| 6 | −4999.439 | 145.500 | | | |
| 7 | 216.565 | 6.600 | 46.54 | 1.80411 | |
| 8 | 96.311 | 15.400 | 67.87 | 1.59319 | 0.303 |
| 9 | −1302.324 | 4.000 | | | |
| 10 | ∞ | (d10 = variable) | (stop) | | |
| 11 | −1908.639 | 8.560 | 37.90 | 1.72342 | |
| 12 | −263.102 | 25.200 | | | |
| 13 | −172.006 | 5.350 | 65.77 | 1.46450 | |
| 14 | 153.765 | (d14 = variable) | | | |

(Variable interval when focusing)

| | Infinity | Closest Focusing Distance (β = −0.11) |
|---|---|---|
| d10 | 6.43030 | 42.56250 |
| d15 | 229.96210 | 193.80311 |

(Condition Corresponding Values)
$\phi_1$ = 1/305.57525 = 0.00327
$|\phi_2|$ = 1/331.59831 = 0.00302

| | | | |
|---|---|---|---|
| (1) $n_d$ = | 1.498 | 1.498 | 1.593 |
| (2) $v_d$ = | 82.5 | 82.5 | 67.9 |
| (3) $\theta_{FCd}$ = | 0.305 | 0.305 | 0.303 |
| (4) $\phi_1 / |\phi_2|$ = | 1.084 | | |
| (5) $n_d'$ = | 1.593 | | |
| (6) $v_d'$ = | 67.9 | | |
| (7) $\theta_{FCd}'$ = | 0.303 | | |

Note that $n_d$, $v_d$ and $\theta_{FCd}$ indicate the condition corresponding values in the sequence of the first, second and third positive lenses from the object side of the first lens group.

| (Image position correcting data) | | |
|---|---|---|
| | Infinity Focusing State | Closest Focusing State |
| Image Position Correcting Displacement Quantity | 1.4 mm (Maximum) | 1.4 mm (Maximum) |
| Corresponding Image Moving Quantity | +1.0 mm (Maximum) | +1.0 mm (Maximum) |

Note that the plus sign of the image moving quantity indicates that the image moves in the same direction as the displacement direction of the image position correcting lens unit.

Figure 17:
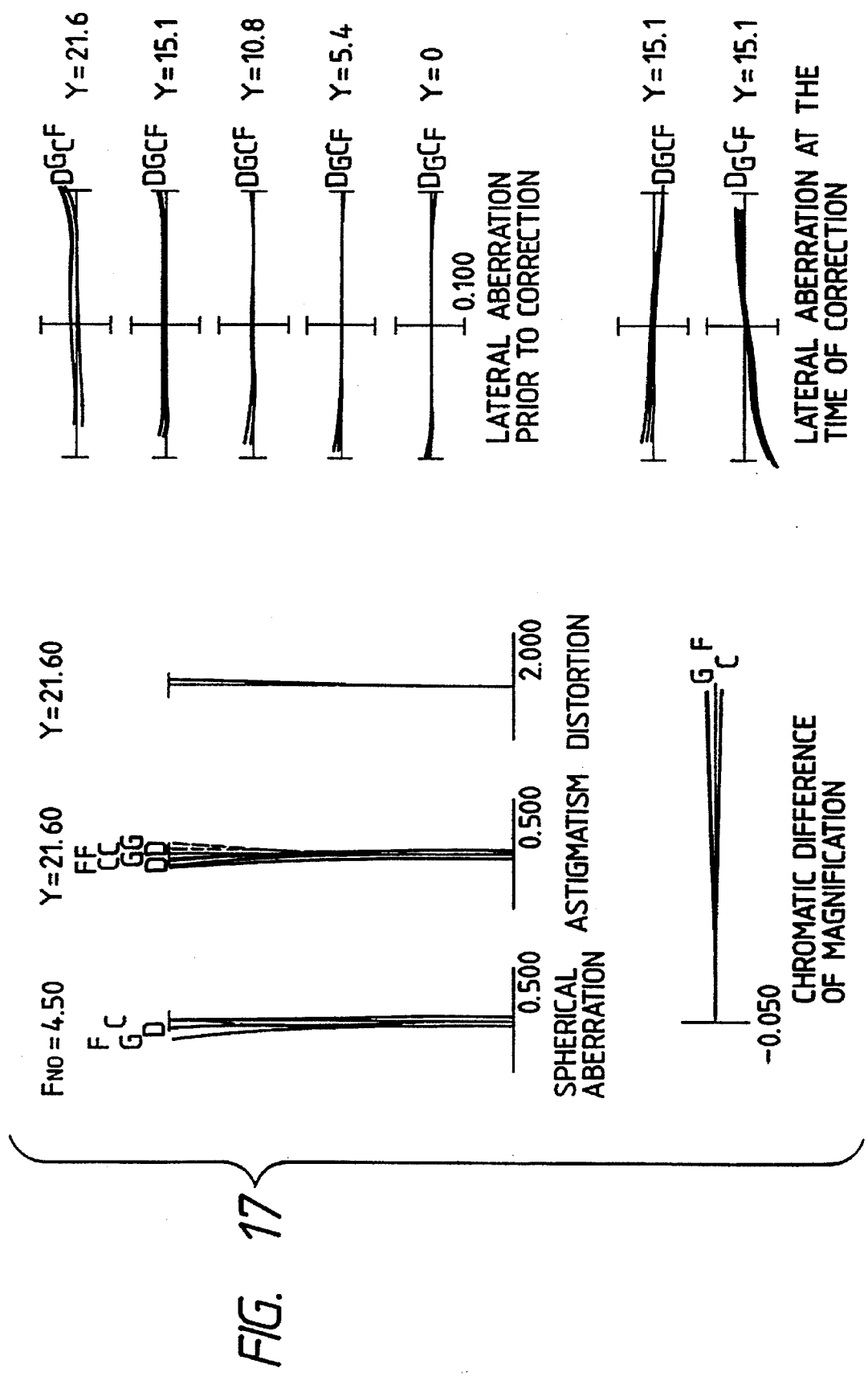
FIG. 17 is a diagram showing the various aberrations in the infinity focusing state in the sixth embodiment of FIG. 16.
Figure 18:
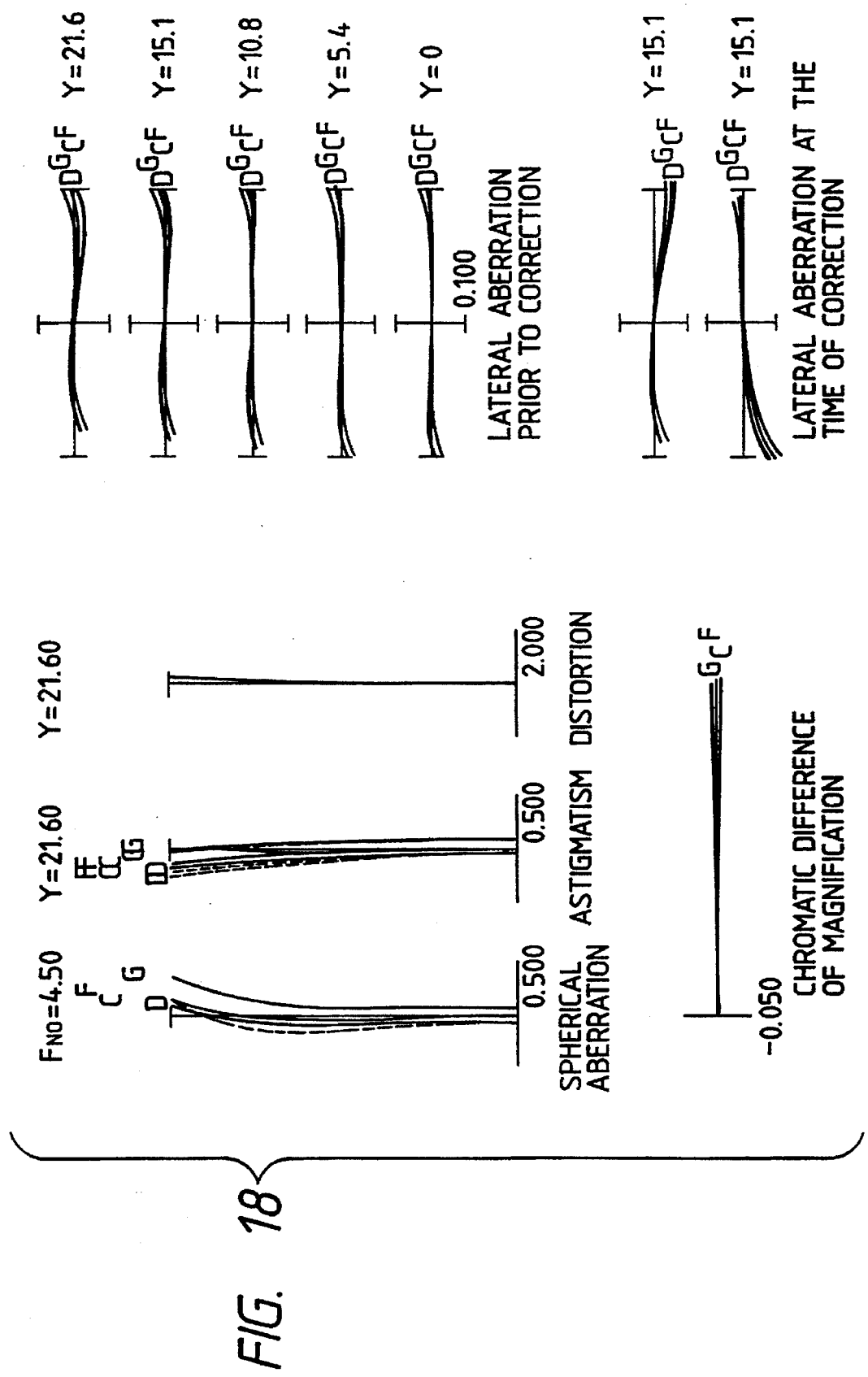
FIG. 18 is a diagram showing the various aberrations in the closest focusing state in the sixth embodiment of FIG. 16.

FIGS. 17 and 18 are diagrams respectively showing various aberrations in the infinity focusing state and in the closest focusing state. Referring to the individual aberration diagrams, $F_{NO}$ represents the F-number, Y designates the image height, D denotes the d-line (λ=587.6 nm), C denotes the C-line (λ=656.3 nm), F represents the F-line (λ=486.1 nm), and G represents the g-line (λ=435.6 nm).

Note that the solid line represents the sagittal image surface, and the broken line indicates the meridional image surface in the aberration diagram showing the astigmatism. Further, the broken line represents the sine condition in the aberration diagram illustrating the spherical aberration. In the aberration diagram showing the chromatic difference of magnification, the d-line is fiducial.

Moreover, in the aberration diagram illustrating the lateral aberration when correcting the image position, the image position correcting displacement quantity is 1.4 mm at the maximum.

As is obvious from the respective aberration diagrams, it can be understood that the various aberrations are well compensated including the time when correcting the image position in accordance with this embodiment.

Note that the moving quantity on the image surface is set to 1.0 mm in the first through sixth embodiments discussed above but may be larger or smaller than this value.

As discussed above, in accordance with the respective embodiments of the present invention, the image position correcting optical system exhibiting a good imaging performance (especially about the chromatic aberration) can be actualized by employing only the optical glass material advantageous in terms of a mass productivity without increasing the number of the lens elements constituting the whole optical systems.

It is apparent that, in this invention, a wide range of different working modes can be formed based on the invention without deviating from the spirit and scope of the invention. This invention is not restricted by its specific working modes except being limited by the appended claims.

What is claimed is:

1. An image position correcting optical system, comprising, sequentially from an object side:

a first lens group having positive refracting power; and a second lens group having negative refracting power, wherein said first lens group is fixed so as not to be movable along an optical axis, said second lens group is provided so as to be movable along the optical axis, a lens subgroup selected from lens elements constituting said first lens group is so provided as to be movable in a direction transverse to the optical axis, and a positive lens element of the lens elements constituting said first lens group satisfies the following conditions:

$1.43 \leq n_d \leq 1.65$ $65 \leq v_d \leq 95$ $0.302 \leq \theta_{FCd} \leq 0.309$ where $n_d$ is the refractive index with respect to the d-line, $n_F$ is the refractive index with respect to the F-line, $n_c$ is the refractive index with respect to the C-line, $v_d$ is the Abbe number with respect to the d-line, and $\theta_{FCd}$ is the partial dispersion ratio expressed by $(n_d - n_c) / (n_F - n_c)$.

2. An image position correcting optical system according to claim 1, wherein said optical system satisfies the following condition:

$0.2 \leq \phi_1/|\phi_2| \leq 1.5$ where $\phi_1$ is the refracting power of said first lens group, and $\phi_2$ is the refracting power of said second lens group.

3. An image position correcting optical system according to claim 1, wherein said first lens group has a front lens group exhibiting positive refracting power and a rear lens group exhibiting positive refracting power, and said rear lens group is the lens subgroup movable in the direction transverse to the optical axis.

4. An image position correcting optical system according to claim 1, wherein all positive lens elements among the lens elements constituting said first lens group are made of the same material.

5. An image position correcting optical system according to claim 1, wherein a closest-to-object positive lens element in said lens subgroup movable in the direction transverse to the optical axis satisfies the following conditions:

$$1.48 \leq n_d' \leq 1.63$$

$$65 \leq v_d' \leq 95$$

$$0.302 \leq \theta_{FCd}' \leq 0.309$$

where $n_d'$ is the refractive index with respect to the d-line, $n_F'$ is the refractive index with respect to the F-line, $n_c'$ is the refractive index with respect to the C-line, $v_d'$ is the Abbe number with respect to the d-line, and $\theta_{FCd}'$ is the partial dispersion ratio expressed by $(n_d'-n_c') / (n_F'-n_c')$.

6. An image position correcting optical system according to claim 1, wherein an aperture stop is disposed in the vicinity of said lens subgroup movable in the direction transverse to the optical axis.

7. An image position correcting optical system according to claim 6, wherein a drive actuator for driving said lens subgroup movable in the direction transverse to the optical axis is constructed integrally with said aperture stop.

* * * * *